(12) United States Patent  (10) Patent No.: US 7,974,423 B2
Matsumura et al.  (45) Date of Patent: Jul. 5, 2011

(54) LOUDSPEAKER SYSTEM

(75) Inventors: Toshiyuki Matsumura, Osaka (JP);
Shuji Saiki, Nara (JP); Sawako Kano,
Hyogo (JP); Mitsukazu Kuze, Osaka
(JP)

(73) Assignee: Panasonic Corporation, Osaka (JP)

( * ) Notice: Subject to any disclaimer, the term of this patent is extended or adjusted under 35 U.S.C. 154(b) by 1170 days.

(21) Appl. No.: 11/660,677

(22) PCT Filed: Aug. 19, 2005

(86) PCT No.: PCT/JP2005/015127
§ 371 (c)(1),
(2), (4) Date: Feb. 21, 2007

(87) PCT Pub. No.: WO2006/022199
PCT Pub. Date: Mar. 2, 2006

(65) Prior Publication Data
US 2007/0286449 A1 Dec. 13, 2007

(30) Foreign Application Priority Data

Aug. 23, 2004 (JP) ................................. 2004-241832

(51) Int. Cl.
*H04R 25/00* (2006.01)
*H04R 1/02* (2006.01)
*H04R 9/06* (2006.01)
*H05K 5/00* (2006.01)
(52) U.S. Cl. ......................... 381/166; 381/345; 181/149
(58) Field of Classification Search .................. 381/165, 381/166, 167, 345, 388, 389; 181/148, 151
See application file for complete search history.

(56) References Cited

U.S. PATENT DOCUMENTS

| 3,617,654 | A | 11/1971 | Heidrich |
| 4,004,094 | A | 1/1977 | Ott |
| 4,101,736 | A | 7/1978 | Czerwinski |
| 4,450,929 | A | 5/1984 | Marrs |
| 2004/0251077 | A1 | 12/2004 | Wright et al. |

FOREIGN PATENT DOCUMENTS

| GB | 2 378 082 | 1/2003 |
| JP | 54-103833 | 7/1979 |
| JP | 54-153930 | 10/1979 |
| JP | 57-69993 | 4/1982 |
| JP | 57-210798 | 12/1982 |
| JP | 60-500645 | 5/1985 |
| JP | 01-226300 | 9/1989 |
| JP | 11-216327 | 2/1999 |

(Continued)

OTHER PUBLICATIONS

European Search Report issued Feb. 3, 2011 in corresponding European Application No. 05780433.

*Primary Examiner* — Tuan D Nguyen
(74) *Attorney, Agent, or Firm* — Wenderoth, Lind & Ponack, L.L.P.

(57) ABSTRACT

A loudspeaker system comprises a cabinet, a speaker unit, a package body, a filler gas, and an absorbent. The speaker unit is mounted in the cabinet. At least one package body is disposed in a vacant space inside of the cabinet and is structured by a bag body for sealing materials thereinto from outside thereof. A predetermined amount of the filler gas is sealed into the package body. A predetermined amount of the absorbent is sealed into the package body and physically absorbs the filler gas.

19 Claims, 15 Drawing Sheets

FOREIGN PATENT DOCUMENTS

| | | |
|---|---|---|
| JP | 11-331967 | 11/1999 |
| JP | 2000-28083 | 1/2000 |
| JP | 2000-319821 | 11/2000 |
| JP | 2003-214134 | 1/2003 |
| JP | 2003-166118 | 6/2003 |
| JP | 2004-537938 | 12/2004 |
| WO | 03/013183 | 2/2003 |

F I G. 2
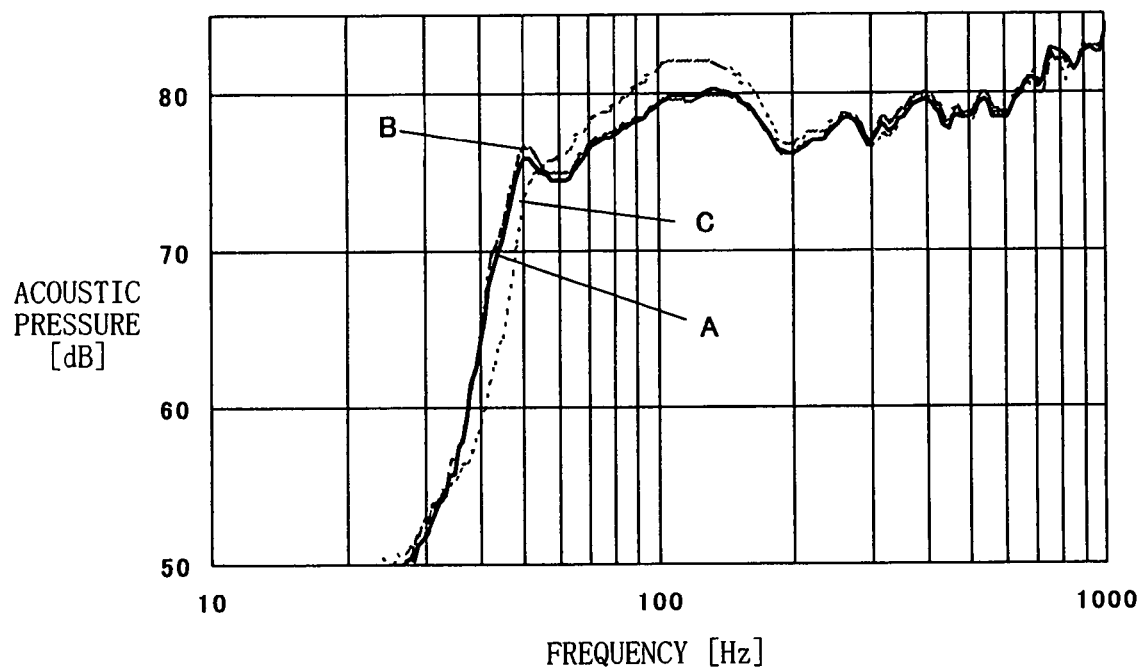

F I G. 1 2
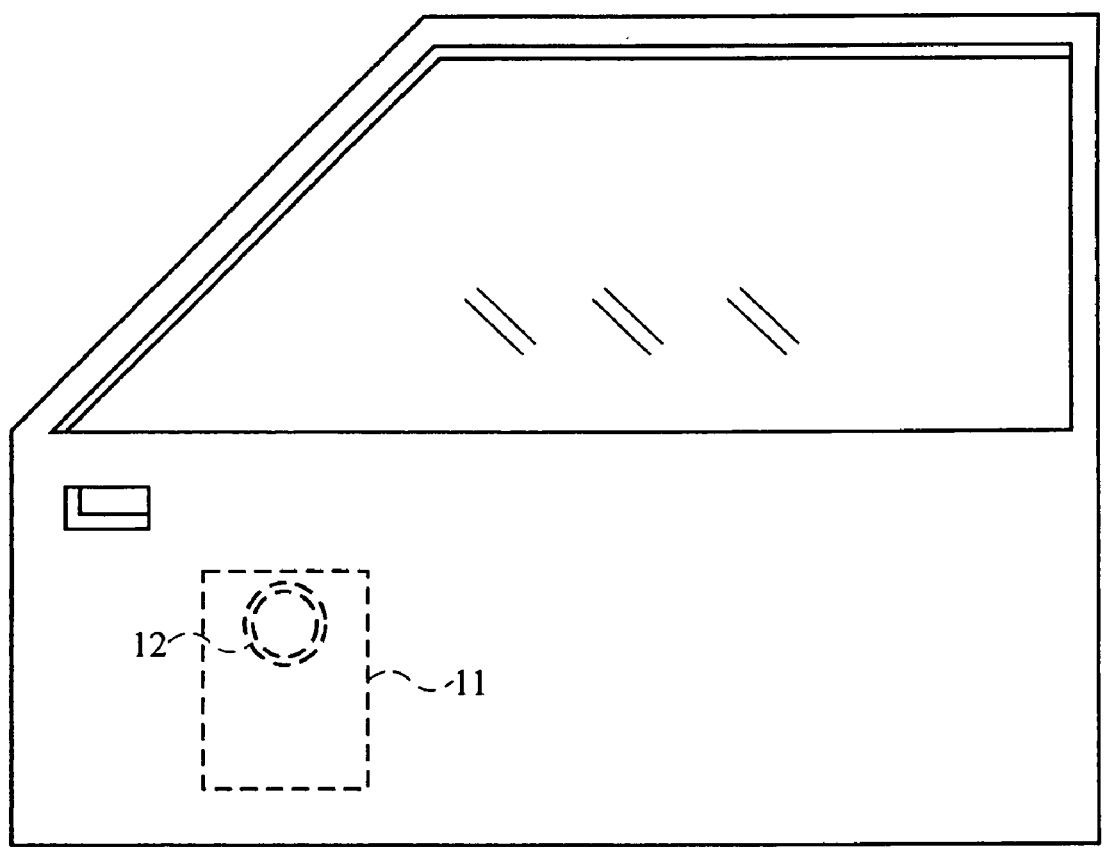

F I G. 1 5 PRIOR ART
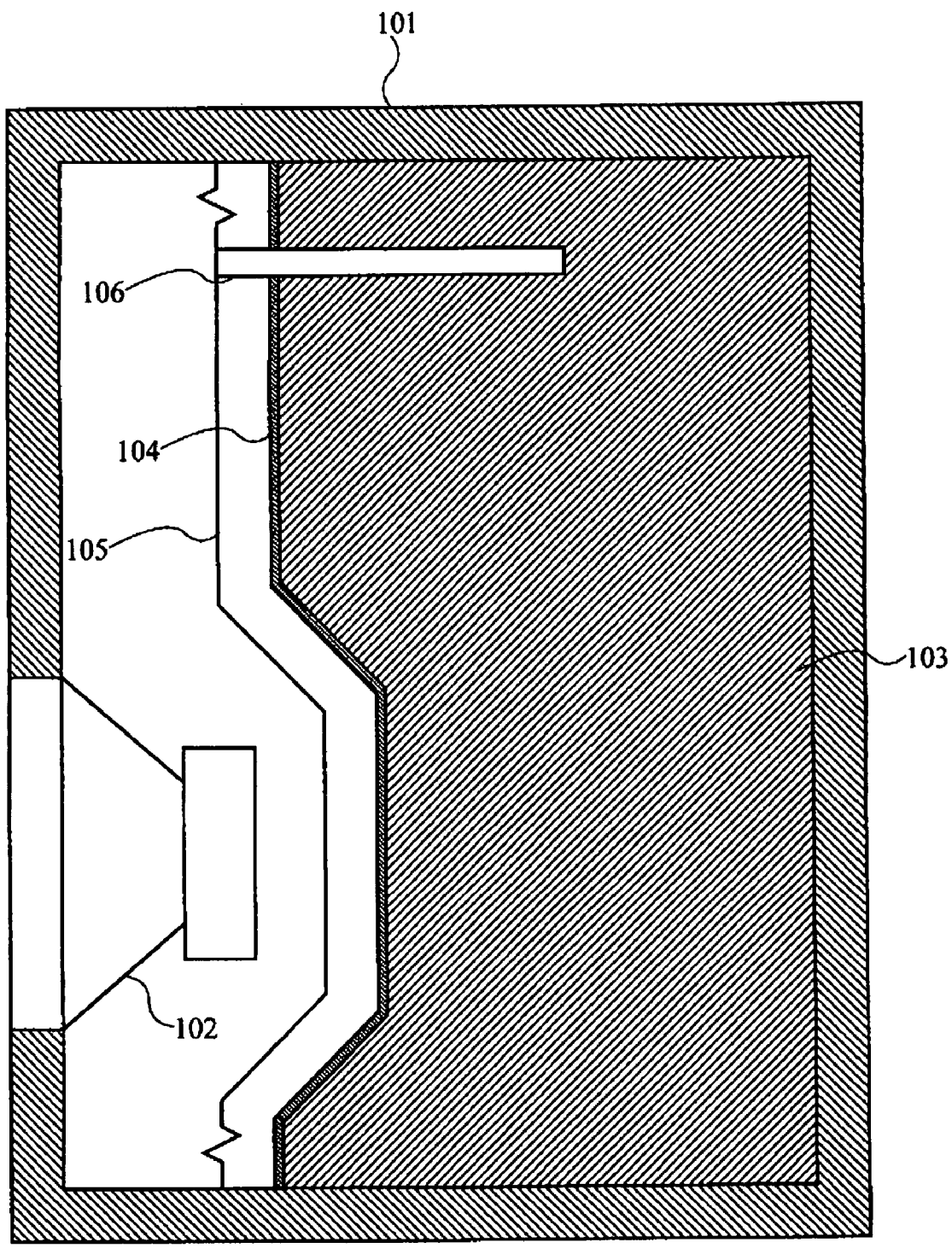

LOUDSPEAKER SYSTEM

TECHNICAL FIELD

The present invention relates to a loudspeaker system and more particularly, to a loudspeaker system which expands a low-pitched sound reproduction band by utilizing a physical absorption phenomenon induced by an absorbent.

BACKGROUND ART

Conventionally, due to acoustic stiffness which a vacant space of a speaker cabinet causes, it has been difficult to realize a loudspeaker system which is compact and capable of reproducing low-pitched sound. As a solution to a problem of the limitation in the low-pitched sound reproduction capability which depends on a cabinet volume, there has been a loudspeaker system in which a block of activated carbon is disposed inside of a cabinet (for example, refer to patent document 1). FIG. 15 is a tectonic profile of a major portion of the loudspeaker system described in the above-mentioned patent document 1.

FIG. 15 is the tectonic profile of the major portion of the loudspeaker system described in the above-mentioned patent document 1. In FIG. 15, the loudspeaker system comprises a cabinet 101, a woofer 102, activated carbon 103, a supporting member 104, a diaphragm 105, and a vent pipe 106. The woofer 102 is attached on a front face of the cabinet 101. The activated carbon 103 is disposed inside of the cabinet 101 in a block-like manner and supported by a back face, a bottom face, an upper face, right and left side faces of the cabinet 101, and the supporting member 104. The supporting member 104 has fine pores formed on an entire surface thereof, through which air passes. The vent pipe 106 is provided on the diaphragm 105 for ventilation between the activated carbon 103 and the woofer 102.

Next, operations of the above-mentioned loudspeaker system will be described. When an electrical signal is applied to the woofer 102, a pressure in the cabinet 101 changes and this pressure vibrates the diaphragm 105. And the vibration of the diaphragm 105 changes a pressure in a vacant space where the activated carbon 103 is disposed. The activated carbon 103 is supported by the supporting member 104 and the cabinet 101 in a block-like manner. Since the supporting member 104 has the fine pores formed on the entire surface thereof, molecules in the air, along with a pressure change caused by the vibration of the diaphragm 105, are absorbed by the activated carbon 103, thereby suppressing the pressure change in the cabinet 101.

As described above, in the conventional loudspeaker system, the cabinet 101 operates as a cabinet which has a large volume, thereby enabling, despite a small size thereof, low-pitched sound reproduction which could be realized if a large cabinet were mounted on a speaker unit. And the vent pipe 106 prevents a pressure change, which is caused by a change in an ambient temperature around the loudspeaker system and a pressure change inside of the loudspeaker system, in a space surrounded by the diaphragm 105, including the activated carbon 103, and the cabinet 101.

On the other hand, as a type of a cabinet which enhances low-pitched sound more than a closed-type cabinet, a bass reflex-type speaker cabinet is used in general. The bass reflex-type loudspeaker system emits low-pitched sound by utilizing acoustic resonance produced by an acoustic volume of the cabinet and an acoustic port provided in the cabinet.

Patent document 1: Japanese translation of PCT international application No. 60-500645

DISCLOSURE OF THE INVENTION

Problems to be Solved by the Invention

In the loudspeaker system disclosed in the above-mentioned patent document 1, moisture or chemical substances in the cabinet comes, via the vent pipe 106, to cover a surface of the activated carbon 103, which causes a reduction in fine pores, capable of physical absorption, of the activated carbon 103, thereby leading to a decline in function of the physical absorption overtime. Furthermore, in a case where in the loudspeaker system disclosed in the above-mentioned patent document 1, the bass reflex-type speaker cabinet is employed, moisture or chemical substances outside of the cabinet comes, via the acoustic port, to cover the surface of the activated carbon 103, thereby further markedly decreasing the function of the physical absorption.

Therefore, an object of the invention is to provide a loudspeaker system in which a decrease in function of physical absorption of an absorbent is prevented and low-pitched sound characteristics are continuously good.

Solution to the Problems

To achieve the above objects, the present invention has the following aspects. A first aspect of the present invention is directed to a loudspeaker system comprising: a cabinet; a speaker unit; a package body; a filler gas; and an absorbent. The speaker unit is mounted in the cabinet. At least one package body is disposed in a vacant space inside of the cabinet and structured by a bag body for sealing materials thereinto from outside thereof.

A predetermined amount of a filler gas is sealed into the package body. A predetermined amount of an absorbent is sealed into the package body and physically absorbs the filler gas.

In a second aspect based on the first aspect, the absorbent is of at least one porous material selected from the group consisting of activated carbon, zeolite, silica ($SiO_2$), alumina ($Al_2O_3$), zirconia ($ZrO_3$), magnesia (MgO), ferrosoferric oxide ($Fe_3O_4$), molecular sieve, fullerene, and carbon nanotube.

In a third aspect based on the first aspect, the package body is structured by a bag body, at least one part of which has an accordion structure. Here, at least one side of the package body having the accordion structure has the alternate convexities and concavities and it is only required that the package body has at least one alternate convexity and concavity. In this case, the package body has a structure in which at least one side has one convexity and one concavity.

In a fourth aspect based on the first aspect, the package body is structured by a bag body formed by a filmy member having flexibility.

In a fifth aspect based on the first aspect, the package body is structured by a filmy member including at least one high polymer material selected from the group consisting of PP (polypropylene), PE (polyethylene), PVA (vinylon), PET (polyethylene terephthalate), PC (polycarbonate), nylon (polyamide), PVC (polyvinyl chloride), and PVDC (polyvinylidene chloride).

In a sixth aspect based on the fourth aspect, the package body is structured by a filmy member including at least one rubber material selected from the group consisting of SBR (styrene-butadiene rubber), SBS (styrene-butadiene-styrene rubber), silicone rubber, IIR (butyl rubber), EPM (ethylene-propylene rubber), and urethane rubber.

In a seventh aspect based on the first aspect, the filler gas has molecules which are capable of being physically absorbed into fine pores formed in the absorbent.

In an eighth aspect based on the first aspect, the package body is disposed so as to hang in the vacant space from an upper side of the cabinet.

In a ninth aspect based on the eighth aspect, the package body is disposed so as to hang in the vacant space and so that a lower end thereof is further fixed to a bottom side of the cabinet.

In a tenth aspect based on the first aspect, the package body is disposed in the vacant space so that at least two opposite ends thereof are respectively fixed to both lateral sides of the cabinet.

In an eleventh aspect based on the first aspect, the loudspeaker system further comprises a board-shaped member. The board-shaped member is disposed in the vacant space so as to be fixed to a part of the cabinet and has a plurality of sound holes formed therein. The package body is disposed in the vacant space so that at least two facing ends are respectively fixed to the board-shaped member and a backside of the cabinet.

In a twelfth aspect based on the first aspect, the package body has a plurality of bag sections which are segmented in a grid manner and connected to each other. The absorbent and the filler gas are respectively sealed into the bag sections.

In a thirteenth aspect based on the twelfth aspect, the package body is structured by the plurality of bag sections which are formed by laminating at least two sheet-like members.

In a fourteenth aspect based on the twelfth aspect, the loudspeaker system further comprises a board-shaped member. The board-shaped member is disposed in the vacant space so as to be fixed to a part of the cabinet and has a plurality of sound holes formed therein. The package body is disposed in the vacant space so that four sides thereof are respectively fixed to the board-shaped member, the backside of the cabinet, and both lateral sides of the cabinet.

In a fifteenth aspect based on the first aspect, the loudspeaker system further comprises a drying agent. A predetermined amount of a drying agent is sealed into the package body.

In a sixteenth aspect based on the first aspect, the loudspeaker system further comprises an acoustic port. The acoustic port is provided at an opening formed in the cabinet, inverts a phase by resonating with sound of a specific frequency, which is emitted from the speaker unit into the vacant space, and emits the sound externally.

A seventeenth aspect of the present invention is directed to a mobile information processing device comprising a loudspeaker system described in any of the above aspects, and a housing in which the loudspeaker system is fixedly disposed.

A eighteenth aspect of the present invention is directed to an audio visual system comprising a loudspeaker system described in any of the above aspects, and a housing in which the loudspeaker system is fixedly disposed.

A nineteenth aspect of the present invention is directed to a vehicle comprising a loudspeaker system described in any of the above aspects and a car body in which the loudspeaker system is fixedly disposed.

Effect of the Invention

According to the above-mentioned first aspect of the present invention, the package bodies having the filler gas and the absorbent sealed thereinto are disposed inside of the cabinet and the absorbent is capable of physically absorbing the filler gas. The package bodies transmit a pressure change, caused by sound reproduced by the speaker unit, to the filler gas, and molecules of the filler gas in the package bodies are absorbed into fine pores of the absorbent or the molecules of the filler gas absorbed into the fine pores of the absorbent are released, thereby allowing a pressure inside of the speaker cabinet to be adjusted. In addition, because deterioration of the absorbent sealed into the package bodies, which is caused by an external gas, can be prevented, performance of adjusting the pressure can be retained for a long period of time. Accordingly, by disposing the package bodies described above in the speaker cabinet, even with a volume of the speaker being small, a loudspeaker system which can reproduce low-pitched sound which is similar to that reproduced in a speaker having a large volume and which is capable of exhibiting stable performance for a long period of time can be realized.

According to the above-mentioned second aspect, the absorbent is of a porous material selected from the group consisting of activated carbon, zeolite, silica ($SiO_2$), alumina ($Al_2O_3$), zirconia ($ZrO_3$), magnesia (MgO), ferrosoferric oxide ($Fe_3O_4$), molecular sieve, fullerene, and carbon nanotube, thereby causing the cabinet to function as if the cabinet had a large volume and realizing low-pitched sound reproduction by utilizing a small cabinet.

According to the above-mentioned third, fourth, fifth, and sixth aspects, by sealing a predetermined amount of the filler gas, even in a case where a volume of the filler gas inside of the package bodies is changed due to influence of a temperature or a pressure, it can be prevented that the package bodies burst or that a factor of inhibiting the package bodies from transmitting the pressure change to the filler gas arises. And deterioration of the absorbent sealed into the package bodies, which is caused by an external gas, can be prevented.

According to the above-mentioned seventh aspect, by filling, as the filler gas, a gas which the absorbent easily absorbs, instead of filling a gas inside of the cabinet as it is, it is easy to control characteristics of absorption and release of the absorbent. Accordingly, low-pitched sound reproduction capability of the loudspeaker system can be further enhanced.

According to the above-mentioned eighth aspect, by hanging the plurality of the package bodies inside of the vacant space, a large number of package bodies can be disposed in a space inside of the vacant space, realizing a loudspeaker system which further enhances low-pitched sound reproduction capability.

According to the above-mentioned ninth aspect, the package bodies inside of the loudspeaker system can be fixed in a stable manner.

According to the above-mentioned tenth aspect, by disposing the plurality of the package bodies in the vacant space so as to be fixed to both lateral sides of the cabinet, a large number of the package bodies can be disposed in the space inside of the vacant space, realizing a loudspeaker system which further enhances low-pitched sound reproduction capability.

According to the above-mentioned eleventh aspect, by disposing the plurality of package bodies in the vacant space so as to be fixed to the board-shaped member and the backside of the cabinet, a large number of the package bodies can be disposed in the space inside of the vacant space, realizing a loudspeaker system which further enhances low-pitched sound reproduction capability. And a pressure change by the speaker unit in the vacant space can be transmitted to the respective package bodies without any mutual inhibition among the package bodies.

According to the above-mentioned twelfth aspect, since a pressure change in the vacant space is transmitted to the absorbent and the filler gas which are respectively segmented, physical absorption effect of the respectively segmented absorbent can be obtained in a further efficient manner, realizing a loudspeaker system which further enhances low-pitched sound reproduction capability.

According to the above-mentioned thirteenth aspect, the package bodies are structured by laminating two sheet-like members, thereby allowing the plurality of the bag sections to be easily formed and facilitating installation in the loudspeaker system.

According to the above-mentioned fourteenth aspect, the absorbent and the filler gas which are sealed into the package bodies in a subdivided manner can be stably disposed in the loudspeaker system.

According to the above-mentioned fifteenth aspect, it can be prevented by the sealed drying agent that moisture contained in the package bodies is absorbed into the absorbent, thereby not inhibiting physical absorption effect of the absorbent. Accordingly, a reduction in physical absorption capability that the absorbent has can be prevented.

According to the above-mentioned sixteenth aspect, the cabinet is a phase-inversion-type cabinet having an apparently large volume, thereby reproducing low-pitched sound at a frequency lower than a frequency of a low-pitched sound reproduction limit, which generally depends on a size of a cabinet. In addition, since in the loudspeaker system, the absorbent disposed inside of the cabinet is sealed into the package bodies, contact of the absorbent with moisture or the like contained in a gas inside of the cabinet and ambient air is prevented, thereby allowing performance of adjusting a pressure to be retained for a long period of time.

In the mobile information processing device, the audio visual system, and the vehicle according to the present invention, the above-described effect can be obtained by mounting the above-described loudspeaker system.

BRIEF DESCRIPTION OF THE DRAWINGS

FIG. 2 is a graph showing frequency characteristics of the loudspeaker system according to the present invention and a conventional loudspeaker system.

FIG. 12 is a diagram illustrating one example of a loudspeaker system used in a car.

FIG. 15 is a diagram illustrating a tectonic profile of a major portion of a conventional loudspeaker system.

Figure 1:
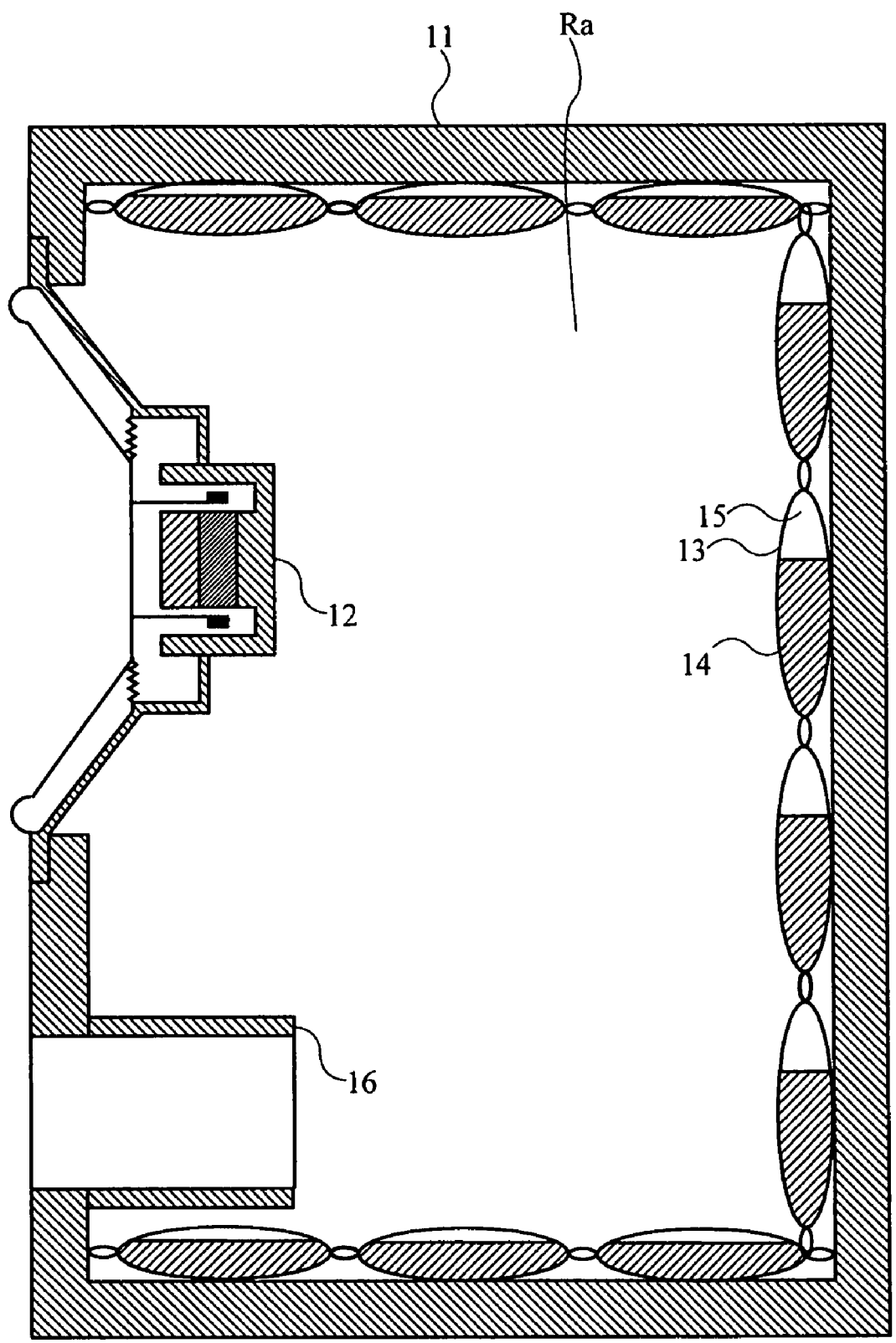
FIG. 1 is a schematic diagram illustrating a cross-sectional view of an internal structure of a loudspeaker system according to a first embodiment of the present invention.

DESCRIPTION OF THE REFERENCE CHARACTERS 11, 21, 31, 41, 51 . . . cabinet
12, 22, 32, 42, 52 . . . speaker unit
13, 23, 33, 43, 53 . . . package body
14, 24, 34, 44, 54 . . . absorbent
15, 25, 35, 45, 55 . . . filled gas
16, 26, 36, 46, 56 . . . acoustic port
47, 57 . . . fixing member

DETAILED DESCRIPTION OF THE INVENTION

First Embodiment

Referring to FIG. 1, a loudspeaker system according to a first embodiment of the present invention will be described. In the loudspeaker system described below, as one example of a phase inversion-type speaker cabinet, a bass reflex-type speaker cabinet is employed. FIG. 1 is a schematic diagram illustrating a cross-sectional view of an internal structure of the loudspeaker system.

In FIG. 1, the loudspeaker system comprises a cabinet 11, a speaker unit 12, a package body 13, an absorbent 14, a filler gas 15, and an acoustic port 16.

The cabinet 11 has a front face, a back face, an upper face, a lower face, and right and left side faces of a housing of the loudspeaker system. The speaker unit 12 is an electrodynamic speaker and mounted at an opening of the front face of the cabinet 11. And a vacant space Ra of the loudspeaker system is formed inside of the cabinet 11.

The acoustic port 16 is provided on the front face of the cabinet 11 and the vacant space Ra formed inside of the cabinet 11 is open to outside. The loudspeaker system emits low-pitched sound by utilizing acoustic resonance produced by an acoustic volume of the cabinet 11 and the acoustic port 16 provided in the cabinet 11.

Inside of the package body 13, the filler gas 15 as well as the absorbent 14 are sealed. A plurality of the above-mentioned package bodies 13 are disposed in the vacant space Ra. In an installation example shown in FIG. 1, the plurality of the package bodies 13 are disposed on an internal wall surface.

The absorbent 14 is a porous material which physically absorbs the filler gas 15 and for example, is activated carbon. The porous material is capable of physically absorbing the filler gas 15 such as air through micro-sized fine pores thereof. As other examples of the absorbent 14, zeolite, silica ($SiO_2$), alumina ($Al_2O_3$), zirconia ($ZrO_3$), magnesia (MgO), ferrosoferric oxide ($Fe_3O_4$), molecular sieve, fullerene, and carbon nanotube may be used. And a combination of some of these materials may be a material of the absorbent 14.

The filler gas 15 is a gas which the absorbent 14 sealed into the package body 13 can physically absorb. Here, any kind of the filler gas 15 which the package body 13 can physically absorb may be used, and it is only required that fine pores formed in an absorbent have molecules capable of physical absorption. For example, a suited gas is selected in consideration of a relationship between pore size distribution of a material of the absorbent 14 and sizes of molecules of the filler gas 15. Specifically, in a case where the absorbent 14 sealed is activated carbon, the filler gas 15 is air, carbon dioxide, nitrogen or the like. Even if the absorbent 14 is other material, these gases can be used as the filler gas 15.

In order to prevent a decline in physical absorption capability of the absorbent 14 due to moisture absorption, it is preferable that the filler gas 15 in a dry state is sealed inside of the package body 13. And inside of the package body 13, a drying agent, together with the absorbent 14 and the filler gas 15, may be sealed. For example, as the drying agent sealed into the package body 13, silica gel, calcium oxide, a calcium chloride processed material, silica alumina gel or the like may be used. By sealing the drying agent inside of the package body 13, inhibition of the physical absorption of the absorbent 14, which is caused when the absorbent 14 absorbs moisture inside of the package body 13, can be prevented. This effect obtained by sealing the drying agent, can be obtained in another embodiment and modified examples in a similar manner and the drying agent may be sealed in the package body in these embodiment and examples.

As the package body 13, a bag body which has flexibility enough to transmit, to an inside thereof, a pressure change caused by sound and whose material achieves high sealing performance is preferable. For example, the package body 13 may be of polymer film such as PP (polypropylene), PE (polyethylene), PVA (vinylon), PET (polyethylene terephthalate), PC (polycarbonate), nylon (polyamide), PVC (polyvinyl chloride), and PVDC (polyvinylidene chloride). And the package body 13 may be of a film rubber material such as SBR (styrene-butadiene rubber), SBS (styrene-butadiene-styrene rubber), silicone rubber, IIR (butyl rubber), EPM (ethylene-propylene rubber), and urethane rubber. The package body 13 may be of flexible rubber high molecular elastomer containing metamorphic bodies of the above-mentioned rubber materials. The package body 13 may be of film made of a compound material of the above-mentioned high molecular film and rubber materials. Further, the package body 13 may be of a thin film material of which moisture proof performance is enhanced by vapor-depositing aluminum, alumina, silicon oxide on an internal surface of a film material such as the above-mentioned materials.

Next, respective amounts of the absorbent 14 and the filler gas 15 sealed into the package body 13 will be described. For example, because in a state of a low temperature and/or a high pressure, an amount of the filler gas 15 which the absorbent 14 physically absorbs increases, if an amount of the filler gas 15 sealed into the package body 13 is not sufficient, an internal surface of the package body 13 adheres to an external surface of the absorbent 14, which may lead to a factor of inhibiting transmission of a pressure change in the cabinet 11 to the filler gas 15. Therefore, at an assured lowest temperature and under an assured highest pressure, an amount of the filler gas 15, which is larger than a volume of the filler gas 15 which the absorbent 14 absorbs, is sealed into the package body 13.

On the other hand, because in a state of a low temperature and/or a high pressure, a volume of the filler gas 15 expands and an amount of the filler gas 15 which the absorbent 14 physically absorbs decreases, a volume of the filler gas 15 sealed into the package body 13 increases, which may cause a burst of the package body 13. Therefore, the package body 13 has a feature that the package body 13 has a volume, beyond assumption, inside thereof so that even if the filler gas 15, which is sealed into the package body 13 at a highest temperature assured for the loudspeaker system and under a lowest pressure assured for the loudspeaker system, expands, a volume is changeable so as to be sufficient. For example, the package body 13 is structured by a bag body member made of highly flexible film, an accordion-structured bag body (described below) or the like, a shape of which is deformed in accordance with expansion/contraction of a volume of the filler gas 15. Here, the volume beyond assumption refers to a volume larger than a volume occupied by the absorbent 14 and the filler gas 15 which are sealed into the package body 13 at a highest temperature assured for a loudspeaker system and under a lowest pressure assured for a loudspeaker system.

Next, operations of the loudspeaker system will be described. Since operations of the speaker unit 12 which is an electrodynamic speaker are well-known, detailed description on the operations of the speaker unit 12 will be omitted. When a music signal is applied to the speaker unit 12, force is generated in a voice coil and causes a diaphragm to vibrate, generating sound. And the speaker unit 12 emits sound to the vacant space Ra inside of the cabinet 11. Here, a resonator is structured by an internal volume of the cabinet 11 (a volume of the vacant space Ra) and an acoustic mass of the acoustic port 16. At a resonance frequency thereof, the sound emitted to an internal space of the cabinet 11 is emitted from the acoustic port 16 in a loud manner. And since the sound emitted from the acoustic port 16 and the sound emitted from the speaker unit 12 are in-phase, by setting the above-mentioned resonance frequency in a low band, low-pitched sound reproduced by the loudspeaker system is amplified. As described above, the loudspeaker system functions as a device employing a phase inversion method in which low-pitched sound is amplified.

And an acoustic pressure generated on the diaphragm of the speaker unit 12 changes an internal pressure in the vacant space Ra of the cabinet 11. In the vacant space Ra, a plurality of the package bodies 13 into which the absorbent 14 and the filler gas 15 are sealed are disposed. Accordingly, the pressure change inside of the vacant space Ra is transmitted via the package bodies 13 to the filler gas 15. For example, when an internal pressure in the vacant space Ra increases, molecules of the filler gas 15 in the package bodies 13 are physically absorbed by the absorbent 14 and an increase in a pressure in the vacant space Ra is suppressed. On the other hand, when an internal pressure in the vacant space Ra decreases, molecules of the filler gas 15 physically absorbed by the absorbent 14 in the package bodies 13 are released and a decrease in a pressure in the vacant space Ra is suppressed. Accordingly, a pressure change in the vacant space Ra is suppressed by gas absorption effect of the absorbent 14 and the vacant space Ra functions as if the vacant space Ra had a large volume. In other words, the above-described loudspeaker system operates as if the speaker unit 12 were attached to the cabinet 11 having a large volume.

As described above, the loudspeaker system of the present embodiment comes to have a phase-inversion-type cabinet having an apparently large volume, thereby reproducing low-pitched sound at a frequency lower than a frequency of a low-pitched sound reproduction limit, which generally depends on a size of a cabinet. In addition, since in the loudspeaker system, the absorbent disposed inside of the cabinet is sealed into the package bodies, contact of the absorbent with moisture or the like contained in a gas inside of the cabinet and ambient air is prevented. In other words, by causing the absorbent 14 not to contact any gas outside of the package bodies 13, such as water vapor, acetaldehyde, and ammonia, which deteriorates absorption capability of the absorbent 14, deterioration in physical absorption capability of the absorbent 14 can be prevented and effect which causes an acoustic volume to be apparently large is not inhibited.

And when the absorbent 14 is powder, sealing the powder into the package bodies 13 can prevent the absorbent 14 from dispersing inside and outside of the cabinet 11.

Furthermore, since the package bodies 13 can be deformed so as to have sufficiently large volumes in consideration of volumes of the absorbent 14 and the filler gas 15 to be sealed and a sufficient amount of the filler gas 15 is sealed, even if volumes of the filler gas 15 inside of the package bodies 13 change due to influence of a temperature and a pressure within a range assured for the loudspeaker system, it never occurs that the package bodies 13 burst and that there accrues a factor of inhibiting the package bodies 13 from transmitting a pressure change in the vacant space Ra to the filler gas 15.

By utilizing the filler gas 15, filling a gas which the absorbent 14 sealed into the package body 13 can easily absorb is enabled. In other words, it is easy to control characteristics of absorption and release of gaseous molecules of the absorbent as compared to a case where a gas inside of the cabinet 11 is a target to be absorbed by an absorbent. Accordingly, filling a gas which the absorbent 14 sealed into the package body 13 can easily absorb allows further enhanced low-pitched reproduction capability of the loudspeaker system.

Although the bass reflex-type cabinet is shown in FIG. 1, various types of cabinets such as a closed-type, a drone cone-type, and other type cabinet can be employed in the loudspeaker system.

Here, referring to FIG. 2, a frequency characteristic of the loudspeaker system will be described. FIG. 2 is a graph showing frequency characteristics A, B, and C which are actually measured in three kinds of loudspeaker systems.

In FIG. 2, the frequency characteristic A shows a characteristic which is actually measured in one example, shown in FIG. 1, of the loudspeaker system according to the present invention. Specifically, inside of the cabinet 11 of the loudspeaker system, the package bodies 13 made of polyethylene resin, in which activated carbon as the absorbent 14 and air as the filler gas 15 are sealed, are disposed. The frequency characteristic B shows a characteristic which is actually measured in the conventional loudspeaker system described in the background art with reference to FIG. 15. An amount of activated carbon disposed is same as that of the activated carbon (absorbent 14) which is disposed inside of the cabinet 11 of the above-mentioned loudspeaker system. The frequency characteristic C shows a characteristic which is actually measured in a loudspeaker system having no absorbent inside of a cabinet. The cabinets and speaker units of the loudspeaker systems in which the frequency characteristics A, B, and C are obtained are identical and the loudspeaker systems are bass reflex-type. The frequency characteristics A, B, and C are obtained under common conditions such as positions of actual measurement (one meter in front) and input (one W).

As is clear when the frequency characteristics A and C are compared, judging from a decreased lowest resonance frequency and improved low-pitched sound reproduction capability of the frequency characteristic A as compared with the frequency characteristic C obtained when the activated carbon is not disposed in the cabinet, it is found that the activated carbon causes a low-pitched sound reproduction band to be expanded. On the other hand, when the frequency characteristic B obtained when the activated carbon is disposed directly in the cabinet and the frequency characteristic A obtained when the activated carbon sealed into the package bodies is disposed in the cabinet are compared, a significant difference between these frequency characteristics is not found and an effect of expanding a low-pitched sound reproduction band of the activated carbon can be seen in both of the frequency characteristics. In other words, it can be seen that the packaged bodies causes little or no inhibition of the pressure change in the cabinet and transmits the pressure change to air and the activated carbon inside of the package bodies. Accordingly, the loudspeaker system according to the present invention, while maintaining a low-pitched sound reproduction band as similarly in a case where the activated carbon is disposed directly in the cabinet, can prevent the absorbent from deteriorating by sealing the absorbent together with a filler gas into the package bodies or the like so as to exclude an external gas, thereby allowing the absorbent of the loudspeaker system to maintain in a long period of time the effect of expanding the low-pitched sound reproduction band.

Second Embodiment

Figure 3:
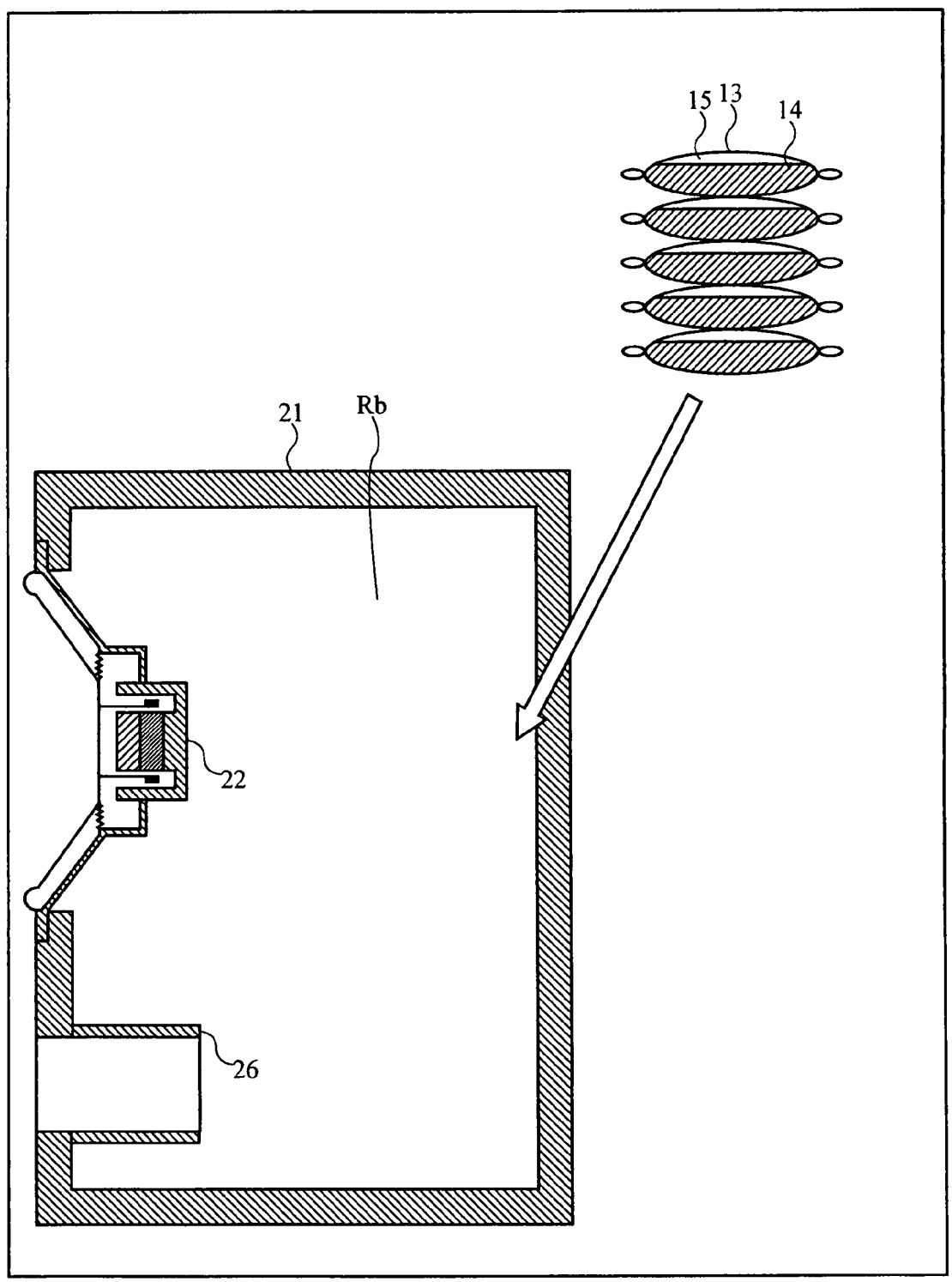
FIG. 3 is a schematic diagram illustrating a cross-sectional view of an internal structure of a loudspeaker system according to a second embodiment of the present invention.

Referring to FIG. 3, a loudspeaker system according to a second embodiment of the present invention will be described. In the loudspeaker system, a bass reflex method similar to that of the first embodiment is employed and package bodies 13 are disposed inside of a cabinet afterward. FIG. 3 is a schematic diagram illustrating a cross-sectional view of an internal structure of the loudspeaker system.

In FIG. 3, the loudspeaker system comprises a cabinet 21, a speaker unit 22, and an acoustic port 26, having a vacant space Rb formed inside of the cabinet 21. Since these components are same as the cabinet 11, the speaker unit 12, and the acoustic port 16 described in the first embodiment, detailed descriptions on the components will be omitted.

Here, the loudspeaker system shown in FIG. 3 is a general bass reflex-type loudspeaker system. The package bodies 13 having absorbent 14 and filler gas 15 sealed thereinto are additionally disposed inside of the vacant space Rb of the general loudspeaker system, thereby allowing a frequency characteristic of the loudspeaker system to be changed. Since the package bodies 13 additionally disposed in the vacant space Rb are same as those described in the first embodiment, detailed descriptions on the package bodies 13 will be omitted.

In the loudspeaker system shown in FIG. 3, a general absorbent is not used. At least one package body 13 is disposed in the vacant space Rb of the loudspeaker system, whereby a pressure change due to sound inside of the cabinet of the loudspeaker system is transmitted to the package body 13. And the pressure change is transmitted via the package body 13 to the filler gas 15. In other words, when an internal pressure in the vacant space Rb increases, molecules of the filler gas 15 in the package body 13 are physically absorbed into the absorbent 14, thereby suppressing an increase in the internal pressure in the vacant space Rb. On the other hand, when the internal pressure in the vacant space Rb decreases, the molecules of the filler gas 15, which have been absorbed into the absorbent 14 in the package body 13, are released, thereby suppressing a decrease in the internal pressure in the vacant space Rb. Accordingly, the pressure change in the vacant space Rb is suppressed due to gas absorption effect of the absorbent 14, thereby causing the vacant space Rb to function as if the vacant space Rb had a large volume. In other words, the package body of the present invention is additionally disposed to the general loudspeaker system, thereby causing the loudspeaker system to operate as if the speaker unit were mounted in a cabinet having a large volume.

As described above, by additionally disposing the package body, the general loudspeaker system in the present embodiment comes to have a phase inversion-type cabinet having an apparently large volume, thereby being capable of reproducing a low-pitched sound at a frequency lower than a frequency of low-pitched sound reproduction limit, which depends on a size of a cabinet. And since in the loudspeaker system, the absorbent disposed inside of the cabinet is sealed into the package body, contact of the absorbent with moisture or the like contained in a gas inside of the cabinet and ambient air is prevented. In other words, causing the absorbent 14 not to contact any gas outside of the package body 13, such as water vapor, acetaldehyde, and ammonia, which deteriorates absorption capability of the absorbent 14, can prevent deterioration in physical absorption capability of the absorbent 14 and effect which causes an acoustic volume to be apparently large is not inhibited.

Although the bass reflex-type cabinet is shown in FIG. 3 as one example in which the package body 13 is additionally disposed, the package body 13 may be disposed inside of various types of loudspeaker systems such as a closed-type, a drone cone-type, and other type loudspeaker system.

Figure 4:
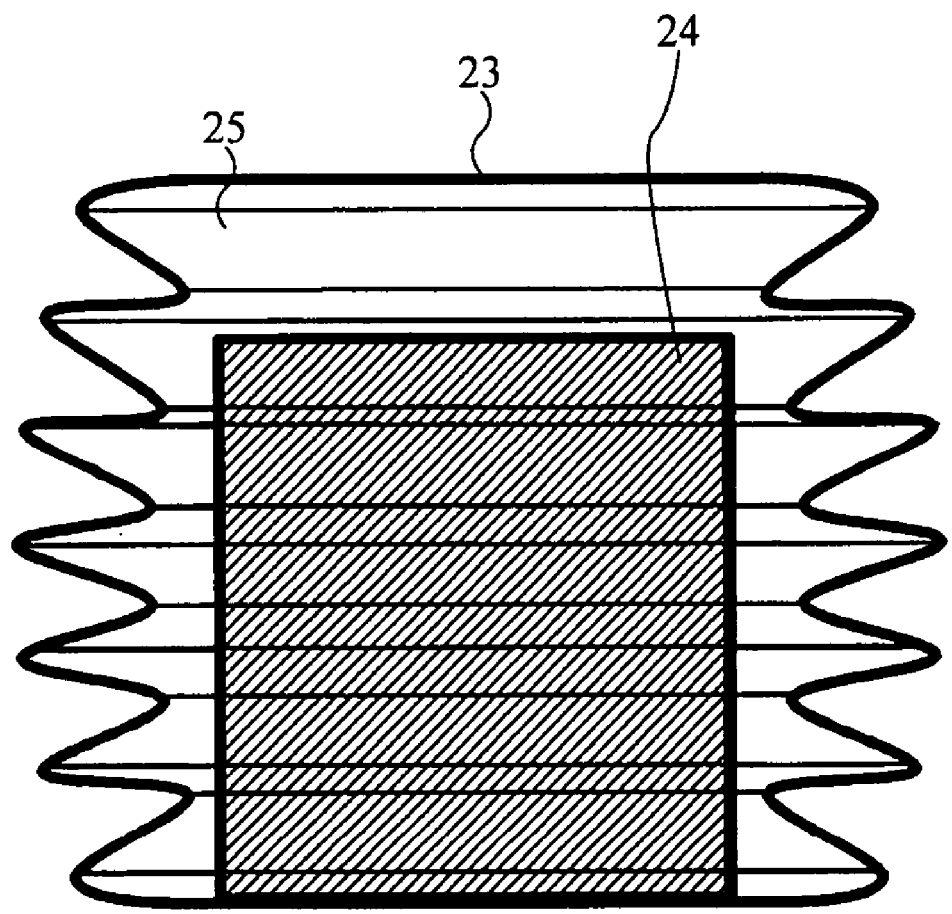
FIG. 4 is a diagram illustrating a side view of a package body 23 structured by a bag body having an accordion structure.
Figure 5:
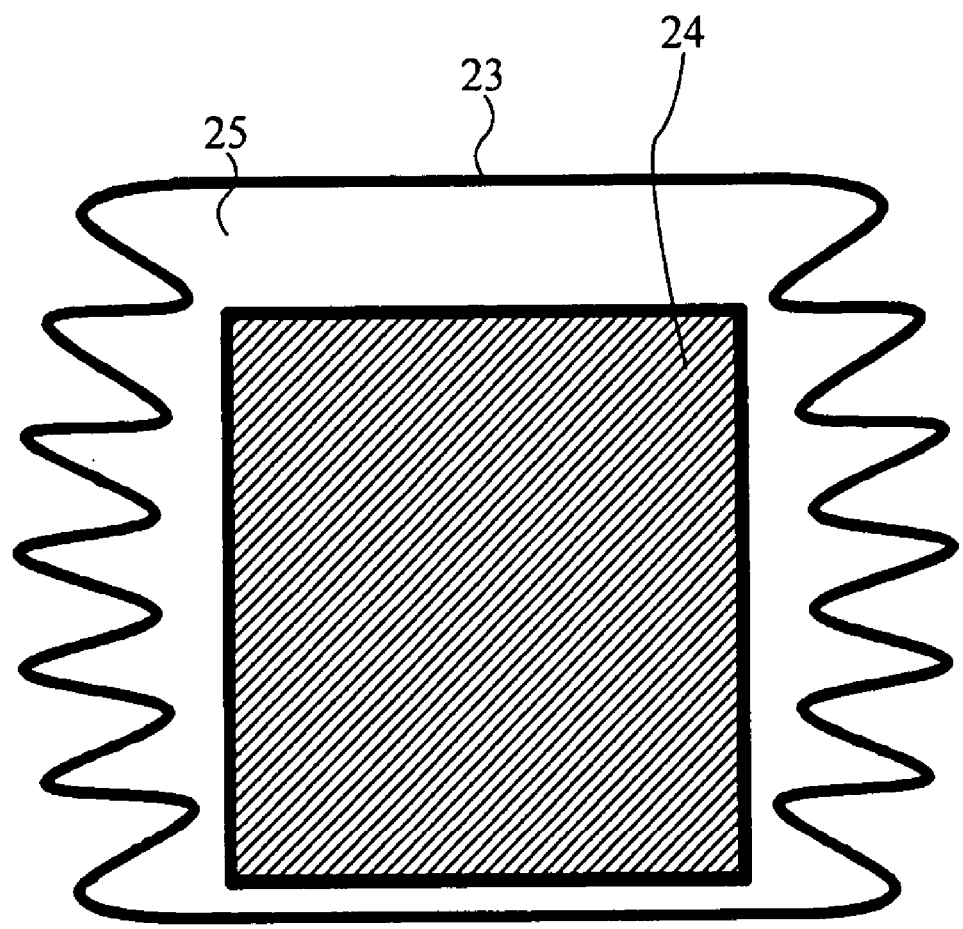
FIG. 5 is a diagram illustrating a cross-sectional view of the package body 23 shown in FIG. 4.

Next, in a first modified example of the first and the second embodiments, a package body having an accordion structure may be used. FIGS. 4 and 5 show one example of a package body having an accordion structure. FIG. 4 is a diagram illustrating a side view of a package body 23 having the accordion structure. And FIG. 5 is a diagram illustrating a cross-sectional view of the package body 23 shown in FIG. 4.

In FIGS. 4 and 5, inside of the package body 23, a filler gas 25 as well as an absorbent 24 are sealed. A plurality of the above-mentioned package bodies 23 are disposed in the vacant spaces Ra and Rb shown in FIGS. 1 and 3. Since the absorbent 24 and the filler gas 25 are same as the above-mentioned absorbent 14 and the above-mentioned filler gas 15, detailed descriptions on the absorbent 24 and the filler gas 25 will be omitted.

The package body 23 is of a hollow-tridimensional cylindrical column or rectangular prism having an accordion structure whose side has alternate convexities and concavities and is expandable and contractible in a predetermined direction. Since materials used for the package body 23 are same as those used for the package body 13 described in the first embodiment, detailed descriptions on the materials will be omitted. At least one side of the package body 23 having the accordion structure has the alternate convexities and concavities and it is only required that the package body 23 has at least one alternate convexity and concavity. In this case, the package body 23 has a structure in which at least one side has one convexity and one concavity.

Because in a state of a low temperature and/or a high pressure, an amount of the filler gas 25 which the absorbent 24 physically absorbs increases, a volume of the filler gas 25 sealed into the package body 23 decreases and a part of the accordion structure of the package body 23 contracts in the above-mentioned predetermined direction. On the other hand, because in a state of a high temperature and/or a low pressure, a volume of the filler gas 25 expands and an amount of the filler gas 25 which the absorbent 24 physically absorbs decreases, a volume of the filler gas 25 sealed into the package body 23 increases and the part of the accordion structure of the package body 23 expands in the above-mentioned predetermined direction. In other words, the package body 23 is a bag body which has the accordion structure whose shape is deformed in accordance with expansion and contraction of the filler gas 25. As described above, at least one part of the package body 23 is formed by the accordion structure, thereby allowing an internal volume to be sufficiently large with respect to volumes of the absorbent 24 and the filler gas 25 to be sealed. In other words, by sealing a sufficient amount of the filler gas 25 inside of the package body 23, even if a volume of the filler gas 25 inside of the package body 23 changes due to influence of a temperature and a pressure which are within a range assured for a loudspeaker system, it never occurs that the package body 23 bursts and that there accrues a factor of inhibiting the package body 23 from transmitting a change in a pressure to the filler gas 25.

The package body 23 may be of a hollow cylinder or the like, whose cross section is racetrack-shaped and whose side is accordion-structured, with any shape of a whole bag body thereof. Although the example in which the one part thereof is accordion-structured is shown in FIGS. 4 and 5, a package body whose entire bag body is accordion-structured may be used.

Figure 6:
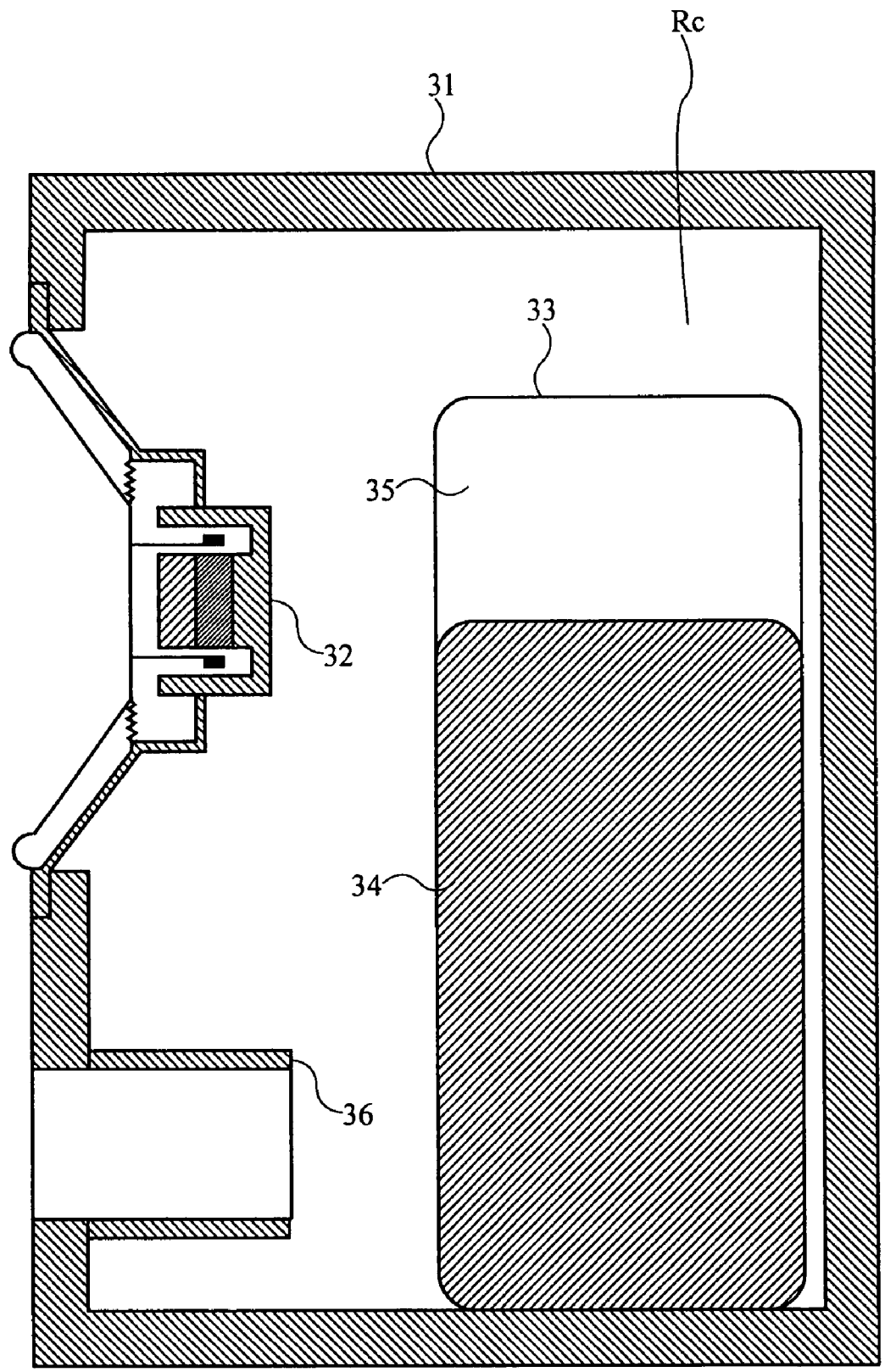
FIG. 6 is a schematic diagram illustrating a cross-sectional view of an internal structure of a loudspeaker system in which a package body 33 structured by one bag body is disposed.

Next, in a second modified example of the first and second embodiments, one package body in which an absorbent and a filler gas are sealed may be disposed inside of a speaker. FIG. 6 is a diagram illustrating one example, as another embodiment, in which a loudspeaker system has one bag body. FIG. 6 is a schematic diagram illustrating a cross-sectional view of an internal structure of the loudspeaker system, inside of which a package body 33 having one bag body is disposed.

In FIG. 6, the loudspeaker system comprises a cabinet 31, a speaker unit 32, a package body 33, an absorbent 34, a filler gas 35, and an acoustic port 36, having a vacant space Rc formed inside of the cabinet 31. Since a configuration of the cabinet 31, the speaker unit 32, and the acoustic port 36 are same as those of the cabinet 11, the speaker unit 12, and the acoustic port 16 described in the first embodiment, detailed descriptions on the configuration will be omitted.

Inside of the package body 33, the absorbent 34 as well as the filler gas 35 are sealed. One package body 33 mentioned above is disposed in the vacant space Rc so as not to close up an opening of the acoustic port 36. In an installation example of the package body 33 shown in FIG. 6, one relatively large package body 33 is disposed on a bottom face of the cabinet 31. Since the absorbent 34 and the filler gas 35, which are sealed into the one package body 33, and the absorbent 14 and the filler gas 15 are different from each other only in the amounts to be sealed, and materials and a relationship between a maximum volume of the package body 33 and the sealed amounts of the absorbent 34 and the filler gas 35 are similar to those of the absorbent 14 and the filler gas 15, detailed descriptions on the materials and the relationship will be omitted. And since materials of the package body 33, which is relatively large as compared to the package body 13, are similar to those of the package body 13, detailed descriptions on the materials will be omitted. It is clearly understood that even when one package body 33 having the absorbent 34 and the filler gas 35 sealed is disposed inside of the vacant space Rc as described above, effect similar to that obtained in the first embodiment can be obtained.

Although in FIG. 6, as one example in which the package body 33 is disposed, a bass reflex-type loudspeaker system is shown, the package body 33 may be disposed in various types of loudspeaker systems such as a closed-type, a drone cone-type, and other type loudspeaker system. Note that when the package body 33 is disposed in the drone cone-type loudspeaker system, it is necessary to dispose the package body 33 so as not to contact the drone cone.

Figure 7:
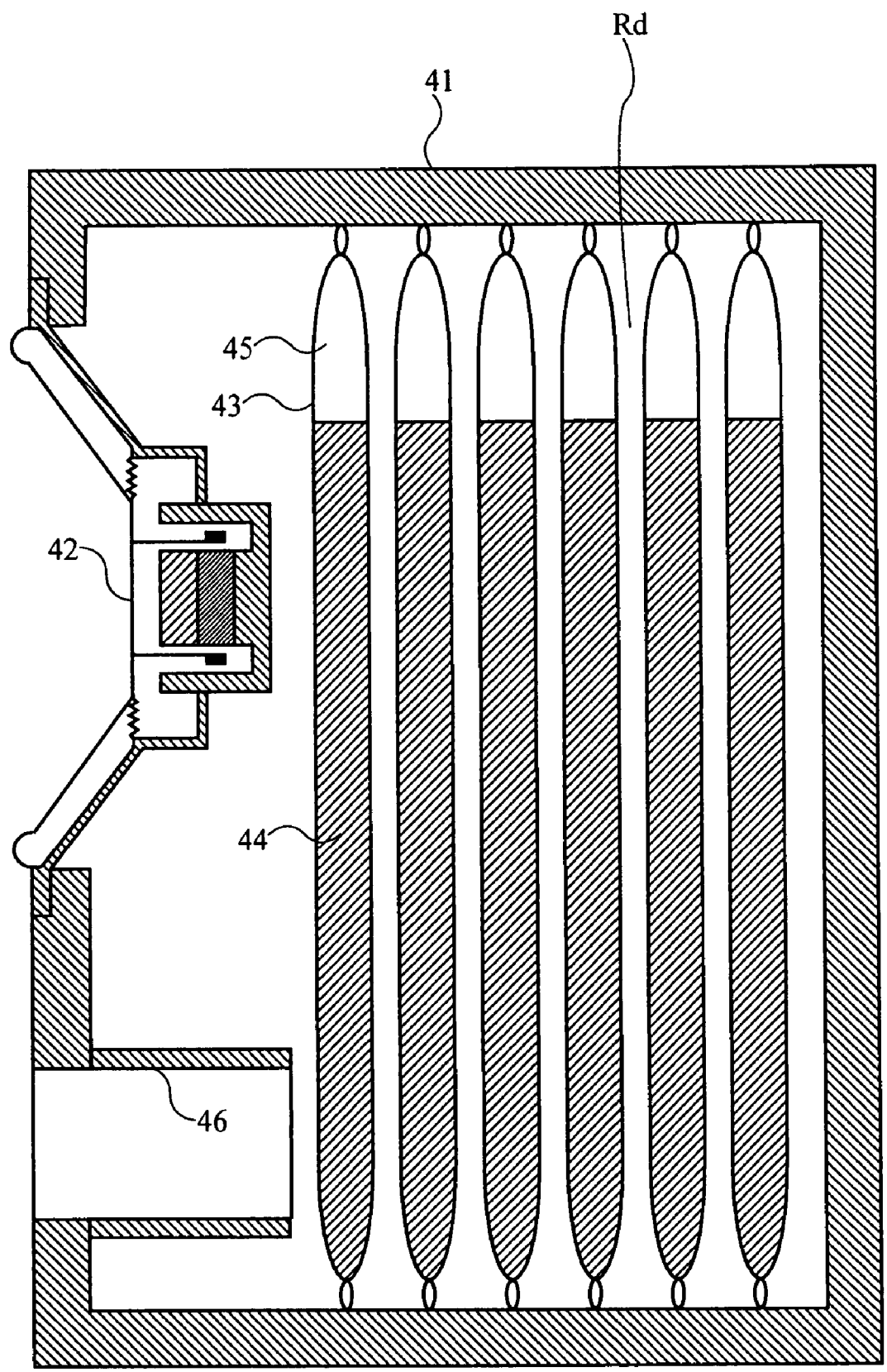
FIG. 7 is a schematic diagram illustrating a cross-sectional view of an internal structure of a loudspeaker system in which a plurality of package bodies 43 structured by bag bodies are disposed so as to hang.

Next, in a third modified example of the first and the second embodiments, a plurality of package bodies in which an absorbent and a filler gas are sealed may be disposed so as to hang from an upper side of a speaker cabinet. FIG. 7 is a diagram illustrating one example, as another embodiment of the package body, in which the plurality of package bodies hang. FIG. 7 is a schematic diagram illustrating a cross-sectional view of an internal structure of a loudspeaker system, inside of which the plurality of the package bodies 43 are disposed so as to hang.

In FIG. 7, the loudspeaker system comprises a cabinet 41, a speaker unit 42, package bodies 43, an absorbent 44, a filler gas 45, and an acoustic port 46, having a vacant space Rd formed inside of the cabinet 41. Since a configuration of the cabinet 41, the speaker unit 42, and the acoustic port 46 are same as those of the cabinet 11, the speaker unit 12, and the acoustic port 16 described in the first embodiment, detailed descriptions on the configuration will be omitted.

Inside of each of the package bodies 43, the absorbent 44 as well as the filler gas 45 are sealed. The plurality of the above-mentioned package bodies 43 are disposed so as to hang from the upper side of the cabinet 41 in the vacant space Rd and not to close up an opening of the acoustic port 46. In an installation example of the package bodies 43 shown in FIG. 7, the plurality of the package bodies 43, for example, which are slender cylinders or the like, are disposed so as to hang. As described above, the plurality of the package bodies 43 are disposed so as to hang inside of the vacant space Rd, thereby allowing a large number of package bodies 43 to be disposed in an internal space of the vacant space Rd. Since the absorbent 44 and the filler gas 35, which are sealed into the one package body 43, and the absorbent 14 and the filler gas 15 are different from each other only in the amounts to be sealed, and materials and a relationship between a maximum volume of the package body 43 and the sealed amounts of the absorbent 44 and the filler gas 45 are similar to those of the absorbent 14 and the filler gas 15, detailed descriptions on the materials and the relationship will be omitted. And since materials of the package body 43, which is relatively long and large as compared to the package body 13, are similar to those of the package body 43, detailed descriptions on the materials will be omitted. As described above, the plurality of the package bodies 43 having the absorbent 44 and the filler gas 45 sealed thereinto are disposed so as to hang inside of the vacant space Rd, whereby a larger amount of the absorbent than that in the first embodiment can be disposed, realizing a loudspeaker system which further enhances low-pitched reproduction capability.

The package body 43 may be disposed so as not only to hang from the upper side of the cabinet 41 but also to be fixed on a bottom side of the cabinet 41. This allows the package body 43 to be stably fixed inside of the loudspeaker system. And the plurality of the package bodies 43 may be fixed so as to be installed on right and left lateral sides of the cabinet 41. Also in this case, a larger amount of the absorbent than that in the first embodiment can be disposed, realizing a loudspeaker system which further enhances low-pitched sound reproduction capability.

Figure 8:
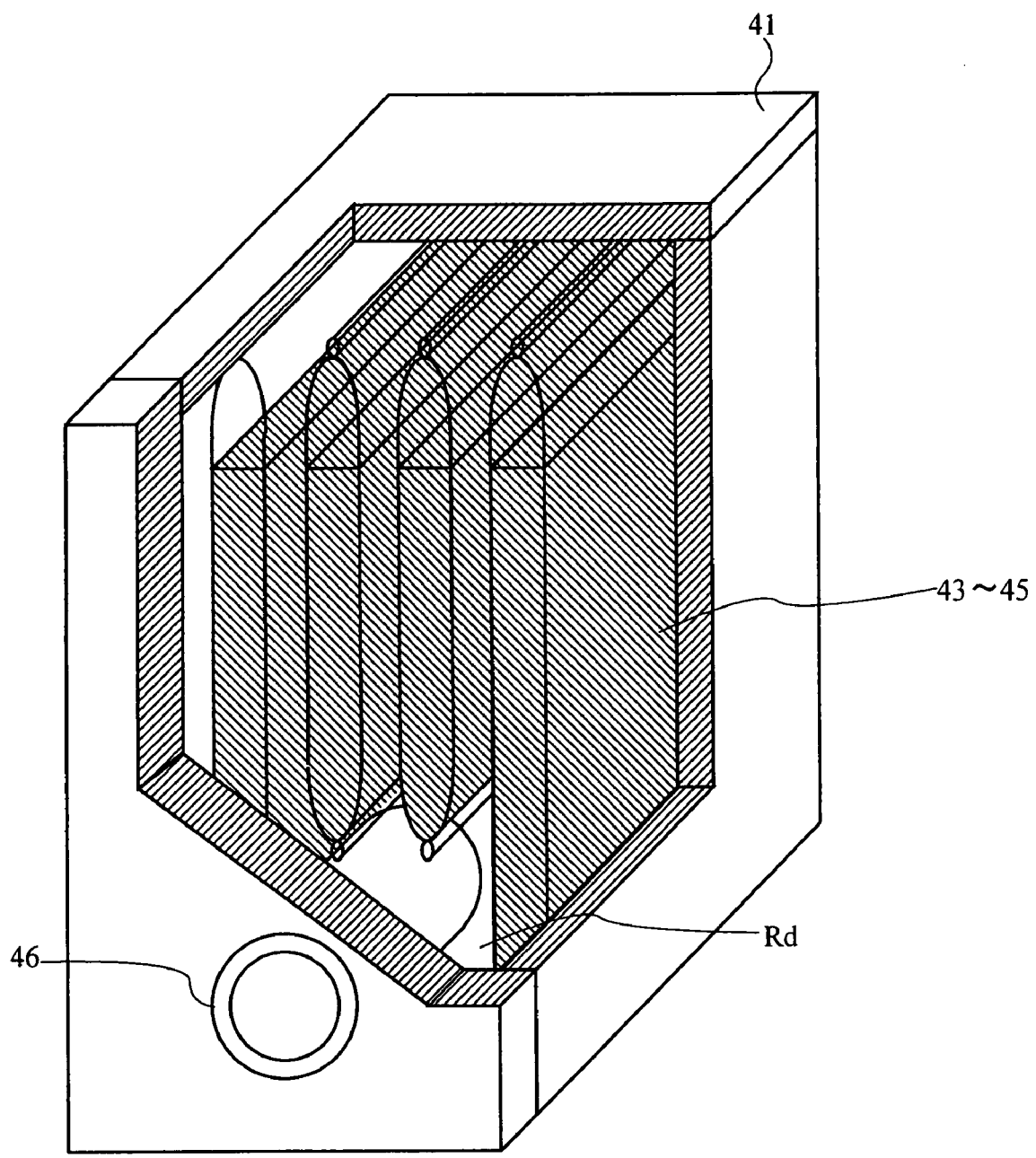
FIG. 8 is a diagram illustrating a cutaway oblique perspective view of a loudspeaker system in which package bodies 43, each of which is structured by a bag body having a hollow thin board shape, are disposed so as to hang in a vacant space Rd.

Although the plurality of the package bodies 43, each of which is of a slender cylinder shape, are disposed so as to hang as shown in FIG. 7, a plurality of package bodies 43, each of which is of other shape, may be disposed so as to hang. For example, FIG. 8 is a diagram illustrating a cutaway oblique perspective view of a loudspeaker system in which package bodies 43, each of which is of a hollow thin board shape, are disposed so as to hang. As shown in FIG. 8, a plurality of package bodies 43, each of which is of a hollow thin board shape, having the absorbent 44 and the filler gas 45 thereinto are disposed so as to hang from the upper side of the cabinet 41 and not to close up an opening of the acoustic port 46. In this case, it is preferable that the package bodies 43 hang from the upper side of the cabinet 41 so that faces of respective boards of the package bodies 43 are in parallel to each other with respect to a central axis of the speaker unit 42. The package bodies are disposed so as to hang from the upper side of the cabinet 41 as described above, whereby a pressure change by the speaker unit 42 in the vacant space Rd can be transmitted to the board-shaped package bodies 43 without any mutual inhibition among the respective package bodies 43. Also in a case where the board-shaped package bodies 43 are disposed so as to hang from the upper side of the cabinet 41 as described above, the respective package bodies 43 may be fixed on the bottom side of the cabinet 41.

Figure 9:
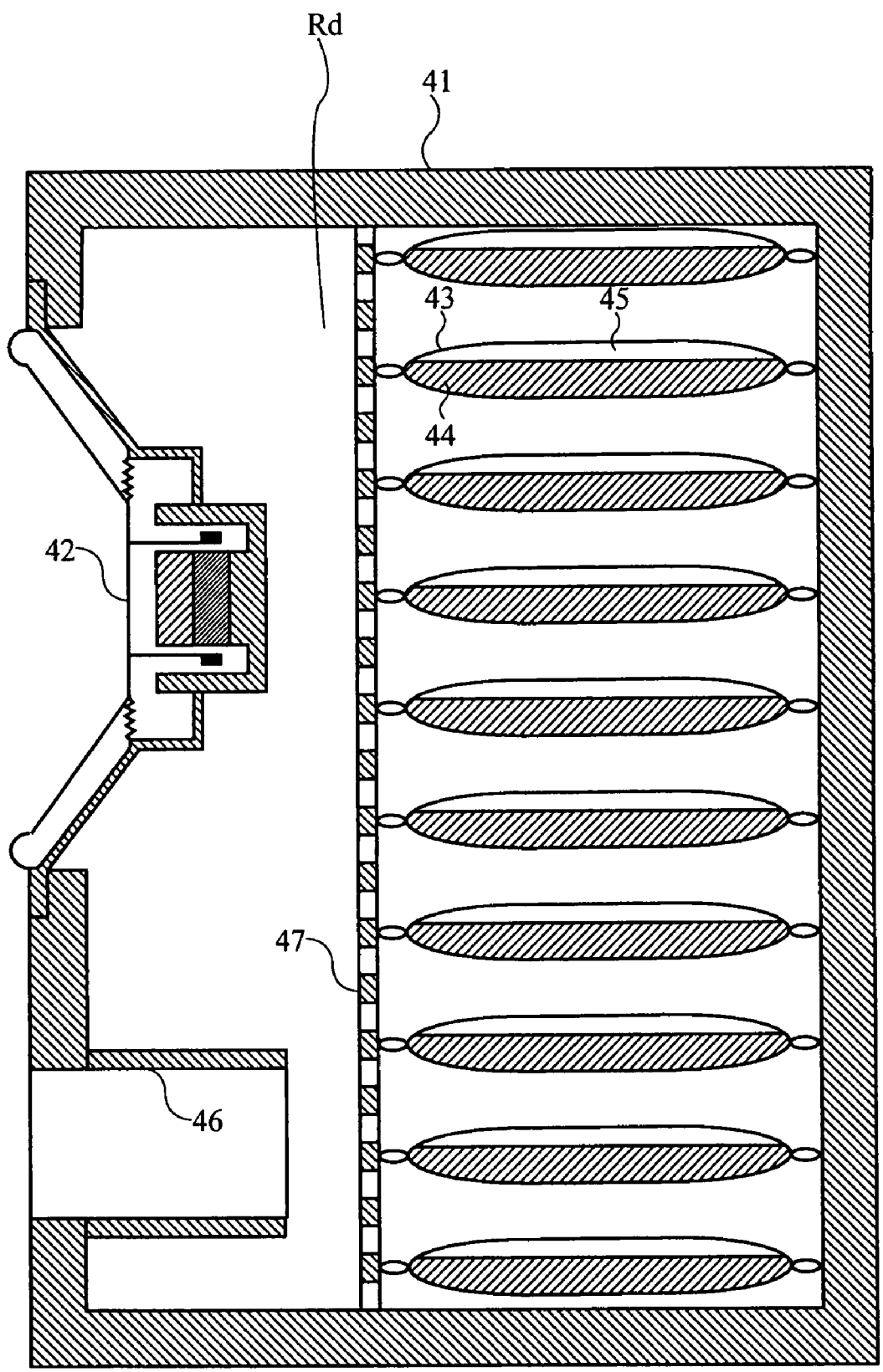
FIG. 9 is the schematic diagram illustrating a cross-sectional view of an internal structure of a loudspeaker system in which the package bodies 43 are disposed so as to be fixed between a fixing member 47 and a cabinet 41.

Next, in a fourth modified example of the first and second embodiments, a fixing member for fixing package bodies inside of a cabinet may be provided. FIG. 9 is a diagram illustrating an example of another embodiment of the package bodies, in which a plurality of bag bodies are fixed between the fixing member and the cabinet. FIG. 9 is the schematic diagram illustrating a cross-sectional view of an internal structure of a loudspeaker system in which a plurality of package bodies 43 comprising the bag bodies are disposed so as to be fixed between the fixing member 47 and the cabinet 41.

In FIG. 9, the fixing member 47 is a board-shaped member having a plurality of sound holes formed therein and fixed between upper and bottom sides of the cabinet 41. The fixing member 47 is fixed inside of the vacant space Rd so as to be perpendicular to a central axis of the speaker unit 42. A plurality of the package bodies 43, which are thin-cylinder-shaped or thin-board-shaped, are respectively fixed between the fixing member 47 and a backside of the cabinet 41 so as not to close up the opening of the acoustic port 46. In a case where the package bodies 43 are thin-board-shaped, the package bodies 43 are fixed between the fixing member 47 and the backside of the cabinet 41 so that respective faces of the thin-board-shaped package bodies are in parallel to each other with respect to the central axis of the speaker unit 42. The plurality of the package bodies 43 having the absorbent 44 and the filler gas 45 sealed thereinto are disposed so as to be installed between the fixing member 47 and the backside of the cabinet 41 as described above, whereby a larger amount of the absorbent than that in the first embodiment can be disposed in the vacant space Rd, realizing a loudspeaker system which further enhances low-pitched sound reproduction capability.

Although in FIGS. 7 to 9, as one example in which the package bodies 43 are disposed, a bass reflex-type loudspeaker system is shown, the package bodies 43 may be disposed in various types of loudspeaker systems such as a closed-type, a drone cone-type, and other type loudspeaker system. Note that when the package body 43 is disposed in the drone cone-type loudspeaker system, it is necessary to dispose the package body 43 so as not to contact the drone cone.

Figure 10:
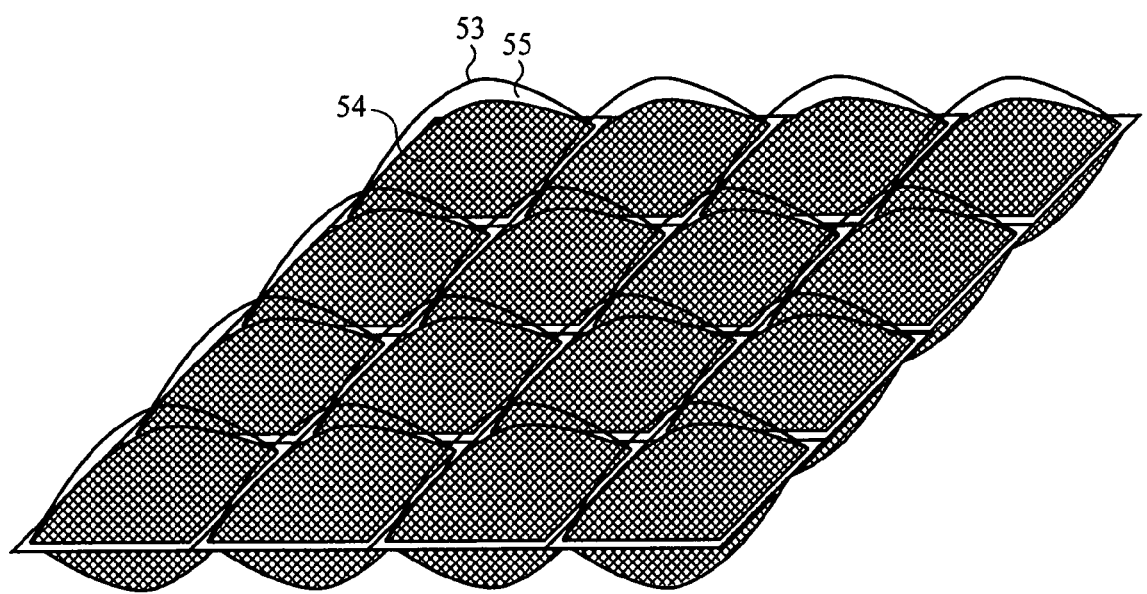
FIG. 10 is a diagram illustrating an oblique perspective view of one example in which package bodies 53 each having a plurality of segments which are mutually connected on a plane are disposed.
Figure 11:
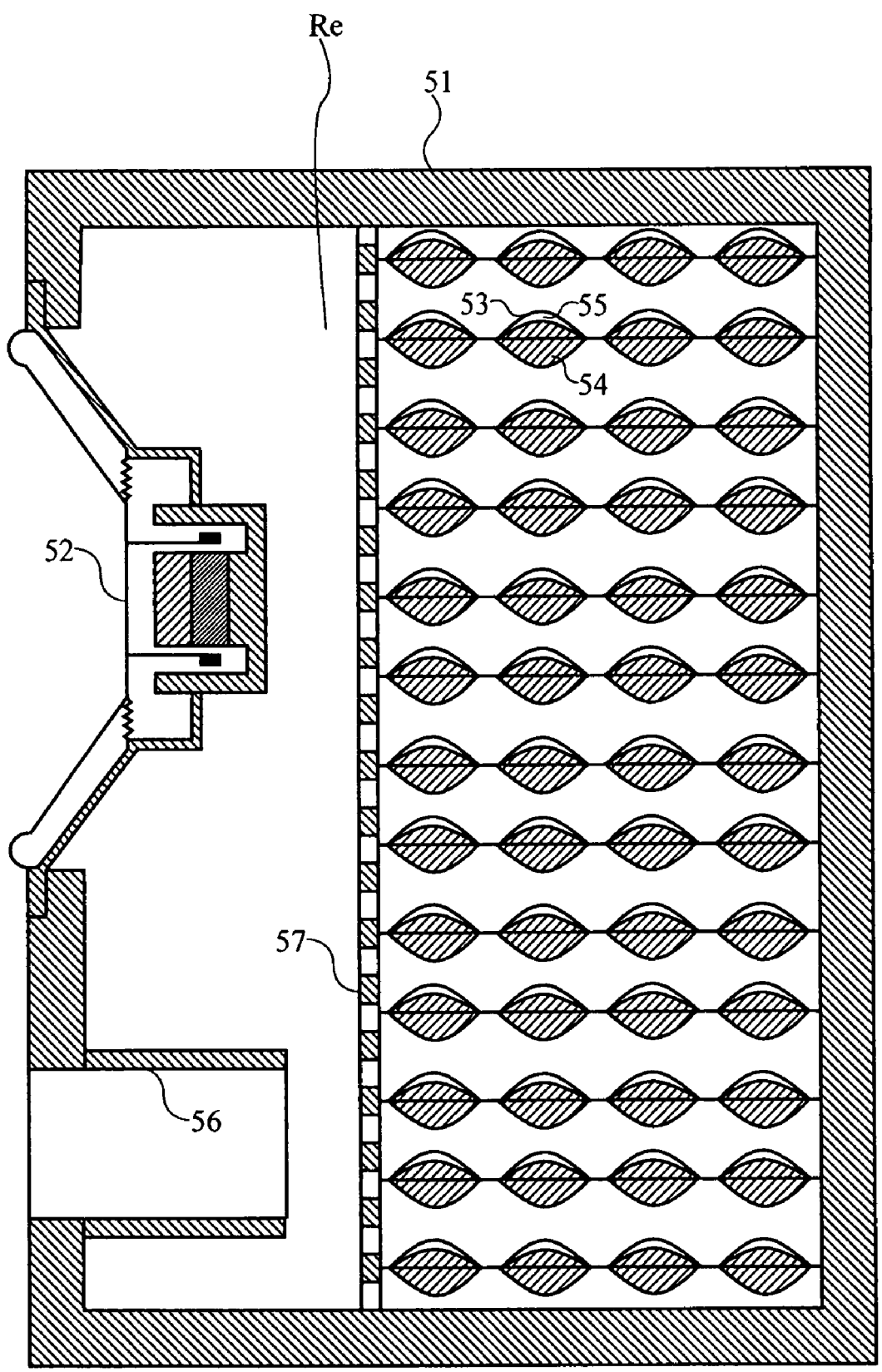
FIG. 11 is a schematic diagram illustrating a cross-sectional view of an internal structure of a loudspeaker system in which the package bodies 53, one of which is shown in FIG. 10, are disposed internally.

Next, in a fifth modified example of the first and the second embodiments, package bodies each having a plurality of segments which are mutually connected on a plane may be disposed in a loudspeaker system. FIG. 10 is a diagram illustrating an oblique perspective view of one example in which package bodies 53 each having a plurality of segments which are mutually connected on a plane are disposed. FIG. 11 is a schematic diagram illustrating a cross-sectional view of an internal structure of a loudspeaker system in which the package bodies 53, one of which is shown in FIG. 10, are disposed internally.

As shown in FIG. 10, in the package body 53, a plurality of bag sections (4×4=16 bag sections in the example shown in FIG. 10) which are segmented in a grid manner are formed. And inside of each of the bag sections of the package body 53, an absorbent 54 and a filler gas 55 are sealed. Since materials of the absorbent 54 and the filler gas 55 are similar to those of the above-mentioned absorbent 14 and filler gas 15, detailed descriptions on the materials will be omitted. For example, the package body 53 is formed by laminating two sheet-like members with a space being kept inside. When laminating the two sheet-like members, predetermined amounts of the absorbent 54 and the filler gas 55 are sealed into the space of each of the above-mentioned bag sections. Here, since materials of the sheet-like members forming the package body 53 are similar to those of the above-mentioned package body 13, detailed descriptions on the materials will be omitted.

Next, amounts of the absorbent 54 and the filler gas 55 sealed into each of the bag sections of the package body 53 will be described. As similarly in the first embodiment, because in a state of a low temperature and/or a high pressure, an amount of the filler gas 55 which the absorbent 54 physically absorbs increases, if an amount of the filler gas 55 sealed into each of the bag sections is not sufficient, a facing side of the above-mentioned sheet-like member adheres to an external surface of the absorbent 54, which may lead to a factor of inhibiting transmission of a pressure change in a cabinet to the filler gas 55. Therefore, at an assured lowest temperature and under an assured highest pressure, an amount of the filler gas 55, which is larger than a volume of the filler gas 55 which the absorbent 54 absorbs, is sealed to each bag section of the package body 53.

On the other hand, because in a state of a high temperature and/or a low pressure, a volume of the filler gas 55 expands and an amount of the filler gas 55 which the absorbent 54 physically absorbs decreases, a volume of the filler gas 55 sealed to each of the bag sections of the package body 53 increases, which may cause a burst of the bag sections. Therefore, each of the bag sections of the package body 53 has a feature that a material of said each bag section of the package body 53 is of expandable and contractible film or the package body 53 has a volume, beyond assumption, inside thereof so that even if the filler gas 55, which is sealed to said each of the bag sections at a highest temperature assured for the loudspeaker system and under a lowest pressure assured for the loudspeaker system, expands, a volume is changeable so as to be sufficient. Here, the volume beyond assumption refers to a volume larger than a volume occupied by the absorbent 54 and the filler gas 55 which are sealed into said each of the bag sections of the package body 53 at a highest temperature assured for a loudspeaker system and under a lowest pressure assured for a loudspeaker system.

In FIG. 11, the loudspeaker system comprises a cabinet 51, a speaker unit 52, package bodies 53, absorbent 54, filler gas 55, an acoustic port 56, and a fixing member 57, having a vacant space Re formed inside of the cabinet 51. Since a configuration of the cabinet 51, the speaker unit 52, and the acoustic port 56 is same as that of the cabinet 11, the speaker unit 12, and the acoustic port 16 described in the first embodiment, detailed descriptions on the configuration will be omitted.

A plurality of the package bodies 53 having the plurality of bag sections which are segmented in a grid manner are disposed in the vacant space Re and four sides of each of the bag sections are respectively fixed to the fixing member 57, and a backside and both lateral sides of the cabinet 51. The package bodies 53 are respectively disposed so as not to close up an opening of the acoustic port 56. And the package bodies 53 are disposed so that respective grid surfaces thereof are in parallel to each other with respect to a central axis of the speaker unit 42. By disposing the package bodies 53 as described above, a pressure change in the vacant space Re by the speaker unit 52 can be transmitted to the package bodies 53 without any inhibition among the package bodies 53.

As described above, the plurality of the package bodies 53, each of which the absorbent 54 and the filler gas 55 are sealed into, are disposed between the fixing member 57 and the cabinet 51, whereby a larger amount of the absorbent than that in the first embodiment can be disposed in the vacant space Re. Since a pressure change in the vacant space Re is transmitted to the absorbent 54 and the filler gas 55 which are respectively segmented, physical absorption effect of the respectively segmented absorbent 54 can be obtained in a further efficient manner, realizing a loudspeaker system which further enhances low-pitched sound reproduction capability. Since the package body 53 can be formed by laminating the two sheet-like members, the plurality of bag sections can be easily formed and easily disposed in the loudspeaker system.

Although the four sides of the package body 53 are respectively fixed between the fixing member 57 and the cabinet 51, at least two facing sides of the package bodies 53 may be respectively fixed to the fixing member 57 and/or the cabinet 51. For example, in a case where two facing sides of the package body 53 are fixed to both lateral sides of the cabinet 51, the fixing member 57 is unnecessary.

Although in FIG. 11, as one example in which the package bodies 53 are disposed, a bass reflex-type loudspeaker system is shown, the package bodies 53 may be disposed in various types of loudspeaker systems such as a closed-type, a drone cone-type, and other type loudspeaker system. Note that when the package bodies 53 are disposed in the drone cone-type loudspeaker system, it is necessary to dispose the package bodies 53 and the fixing member 57 so as not to contact the drone cone.

Here, the above-described loudspeaker system having the package bodies can be used as an in-car loudspeaker system. FIG. 12 is a diagram illustrating one example of a loudspeaker system used in a car.

In FIG. 12, the above-mentioned loudspeaker system is fixedly disposed inside of a door of a car. In FIG. 12, the loudspeaker system described as one example of the first embodiment is indicated by a broken line and as components thereof, only the cabinet 11 and the speaker unit 12 are shown.

In general, in a case where a loudspeaker system excellent in low-pitched sound reproduction capability is mounted, in order to reproduce desired low-pitched sound, a cabinet having a large volume is required. On the other hand, a space for disposing the loudspeaker system, which is allowed in a space inside of a door of a car, is small and a member of the door is used as a speaker cabinet in general. However, despite a small volume of the cabinet, the loudspeaker system of the present invention has high capability of low-pitched sound reproduction, which is achieved by physical absorption effect obtained through disposing the absorbent 14 sealed into the package bodies 13. In other words, even if a volume of the cabinet is limited because an allowable space is small, an in-car loudspeaker system which can reproduce low-pitched sound in an excellent manner is realized.

Figure 13:
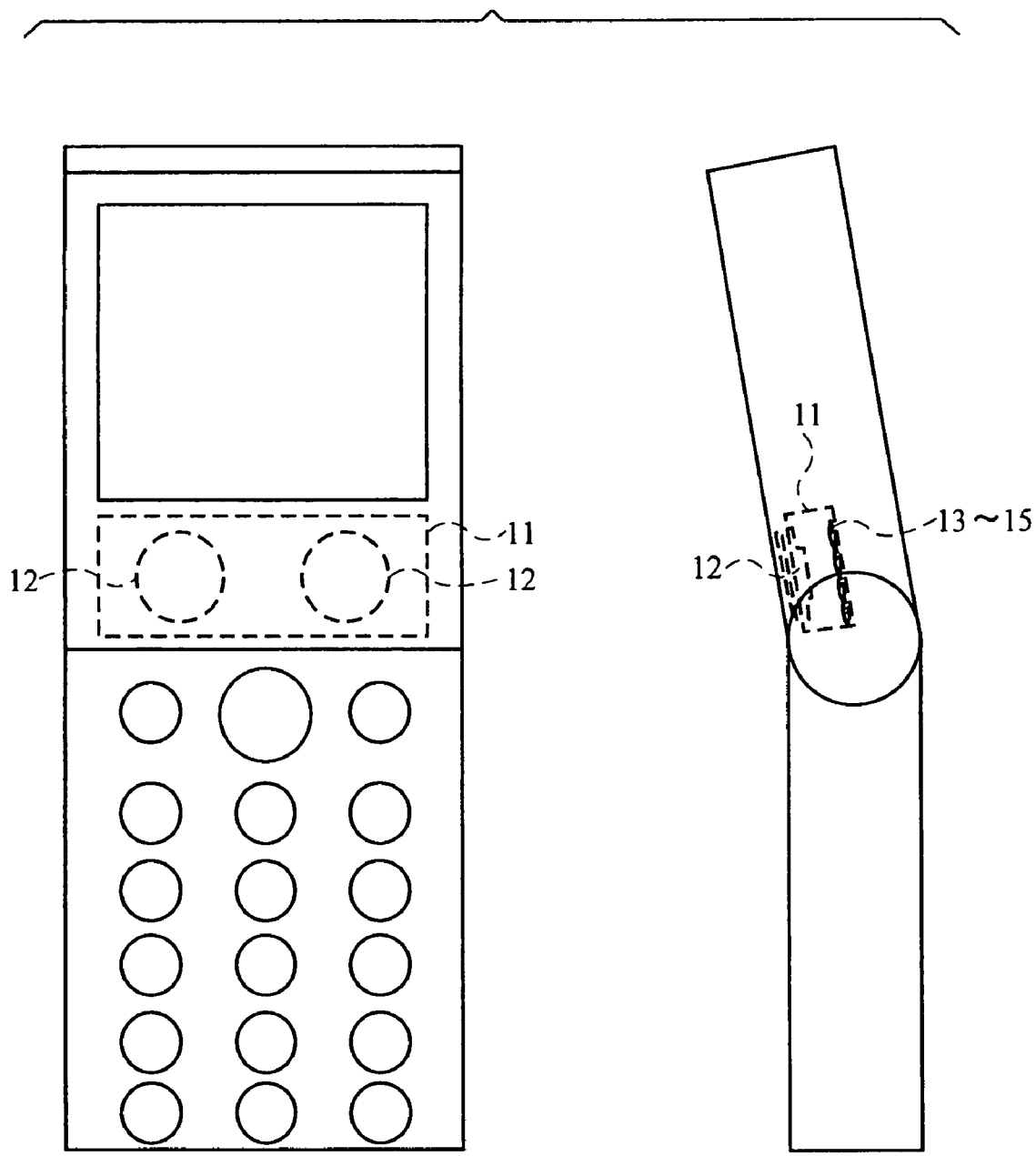
FIG. 13 is a diagram illustrating a front view and a side view of one example of a loudspeaker system mounted in a mobile telephone.

In addition, the above-described loudspeaker system having the package bodies can be used as a loudspeaker system for an information processing device, for example, such as a mobile telephone. FIG. 13 is a diagram illustrating a front view and a side view of one example of a loudspeaker system mounted in a mobile telephone.

In FIG. 13, the above-mentioned loudspeaker system is fixedly disposed inside of a housing of a mobile telephone. In FIG. 13, the loudspeaker system described as one example of the first embodiment is indicated by a broken line and as components thereof, the cabinet 11, the speaker unit 12, and the package body 13 having the absorbent 14 and the filler gas 15 sealed thereinto are shown.

As described above, in a case where a loudspeaker system excellent in low-pitched sound reproduction capability is mounted, in order to reproduce desired low-pitched sound, a cabinet having a large volume is required. On the other hand, since miniaturization of a mobile device such as a mobile telephone is invariably required, a space for disposing the loudspeaker system, which is allowable for a space inside of a housing of a mobile telephone, is small. However, despite a small volume of the cabinet, the loudspeaker system of the present invention has high capability of low-pitched sound reproduction, which is achieved by physical absorption effect obtained through disposing the absorbent 14 sealed into the package bodies 13. In other words, even if a volume of the cabinet is limited because an allowable space is small, a loudspeaker system for a mobile information processing device, which can reproduce low-pitched sound in an excellent manner is realized. The cabinet 11 mounted in a mobile device may be a phase inversion-type cabinet.

Figure 14:
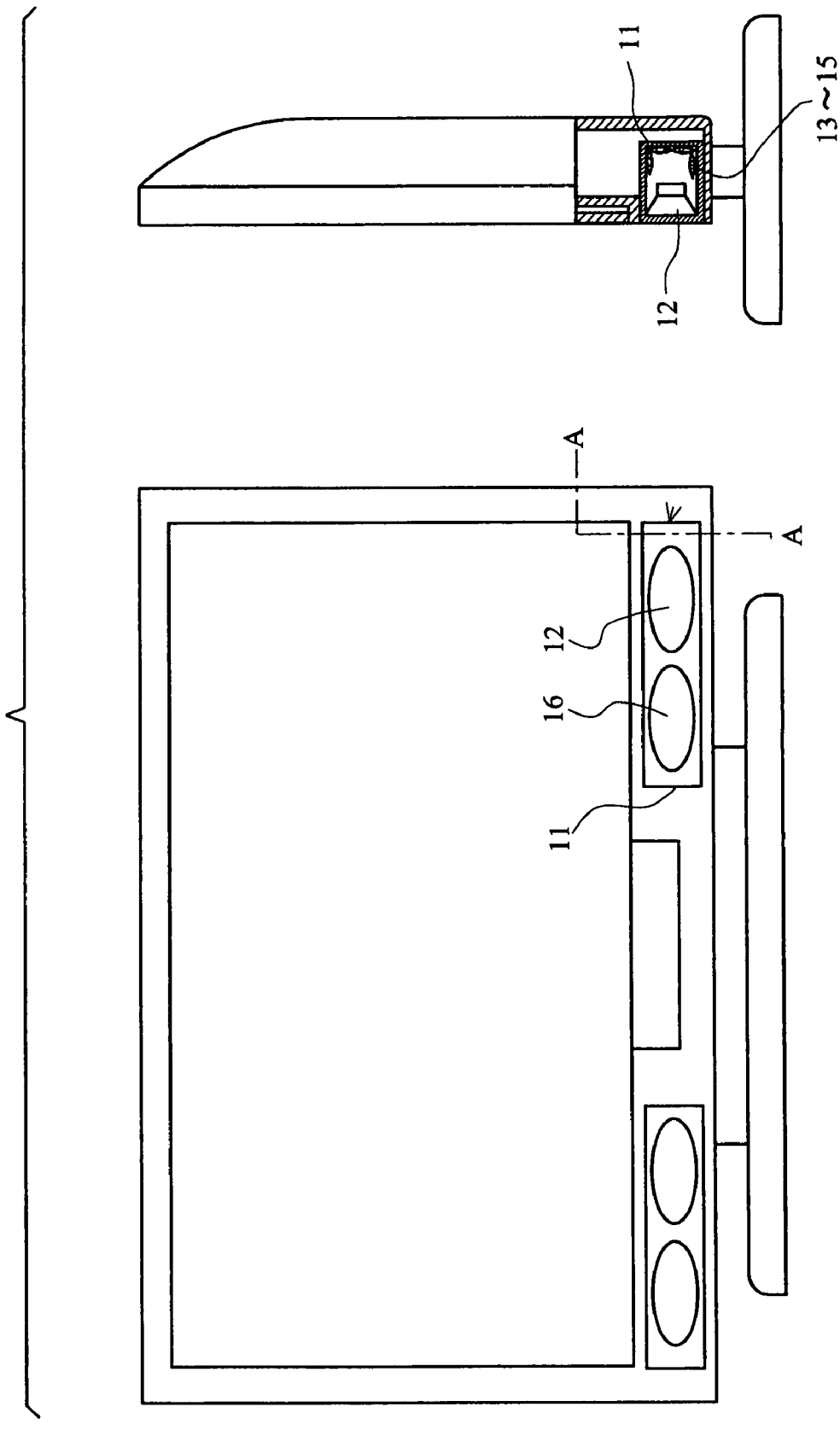
FIG. 14 is a diagram illustrating a front view and a side view, which is a cross-sectional view, showing a part of an internal structure, along a line A-A in the front view, of one example of a configuration in which the loudspeaker system is mounted in a television.

In addition, the above-described loudspeaker system having the package bodies is applicable to a speaker system used for an AV system such as a liquid crystal display television which is increasingly becoming flat, a PDP (plasma display), a stereo unit, and a home theater system for 5.1-channel reproduction. Specifically, the loudspeaker system is used as a speaker system mounted in a thin-screen television. FIG. 14 is a diagram illustrating a front view and a side view, which is a cross-sectional view, showing a part of an internal structure, along a line A-A in the front view, of one example of a configuration in which the loudspeaker system is mounted in a television.

In FIG. 14, the above-mentioned loudspeaker systems are fixedly disposed at either right and left inside of a housing of a thin-screen television. In FIG. 14, as components of the loudspeaker system described in the first embodiment, the cabinet 11, the speaker unit 12, the absorbent 14, the package body 13 having the filler gas 15 sealed thereinto, and the acoustic port 16 are shown.

As described above, in a case where a loudspeaker system excellent in low-pitched sound reproduction capability is mounted, in order to reproduce desired low-pitched sound, a cabinet having a large volume is required. On the other hand, making a thinner television is invariably required and a space for disposing the loudspeaker system, which is allowable for a space inside of a housing of a thin-screen television, is very small. However, despite a small volume of the cabinet, the loudspeaker system of the present invention has high capability of low-pitched sound reproduction, which is achieved by effect obtained by a phase inversion method and physical absorption effect obtained through disposing the absorbent 14 sealed into the package bodies 13. In other words, even if a volume of the cabinet is limited because an allowable space is small, an in-car loudspeaker system for an AV system, which can reproduce low-pitched sound in an excellent manner is realized.

In this way, in the above-described loudspeaker system, the package bodies having the filler gas and the absorbent sealed thereinto are disposed inside of the cabinet and the absorbent is capable of physically absorbing the filler gas. And the package bodies transmit a pressure change, caused by sound reproduced by the speaker unit, to the filler gas, and molecules of the filler gas in the package bodies are absorbed into fine pores of the absorbent or the molecules of the filler gas absorbed into the fine pores of the absorbent are released, thereby allowing a pressure inside of the speaker cabinet to be adjusted. In addition, because deterioration of the absorbent sealed into the package bodies, which is caused by an external gas, can be prevented, performance of adjusting the pressure can be retained for a long period of time. Accordingly, by disposing the package bodies described above in the speaker cabinet, even with a volume of the speaker being small, a loudspeaker system which is capable of reproducing low-pitched sound which is similar to that reproduced by a speaker having a large volume and which is capable of exhibiting stable performance for a long period of time can be realized.

INDUSTRIAL APPLICABILITY

A loudspeaker system according to the present invention is excellent in low-pitched sound reproduction capability even with a volume thereof being small and is useful as a loudspeaker system used in a variety of systems such as an in-car system and a mobile device system.

The invention claimed is:
1. A loudspeaker system comprising:
a cabinet;
a speaker unit which is mounted in the cabinet;
a package body which is disposed in a vacant space inside of the cabinet and includes a bag body for sealing materials thereinto from an external gas, the package body being vibratable due to a pressure change of the external gas;
a predetermined amount of a filler gas which is sealed in the package body; and
a predetermined amount of an absorbent which is sealed in the package body and physically absorbs the filler gas.
2. A mobile information processing device comprising
a loudspeaker system described in claim 1 and
a housing in which the loudspeaker system is fixedly disposed.
3. An audio visual system comprising
a loudspeaker system described in claim 1 and
a housing in which the loudspeaker system is fixedly disposed.
4. A vehicle comprising
a loudspeaker system described in claim 1 and
a car body in which the loudspeaker system is fixedly disposed.
5. The loudspeaker system according to claim 1, wherein the absorbent is made of at least one porous material selected from the group consisting of activated carbon, zeolite, silica ($SiO_2$), alumina ($Al_2O_3$), zirconia ($ZrO_3$), magnesia (MgO), ferrosoferric oxide ($Fe_3O_4$), molecular sieve, fullerene, and carbon nanotube.

6. The loudspeaker system according to claim 1, wherein at least one part of the bag body has an accordion structure.

7. The loudspeaker system according to claim 1, wherein the bag body is formed by a filmy member having flexibility.

8. The loudspeaker system according to claim 1, wherein the package body includes a filmy member including at least one high polymer material selected from the group consisting of PP (polypropylene), PE (polyethylene), PVA (vinylon), PET (polyethylene terephthalate), PC (polycarbonate), nylon (polyamide), PVC (polyvinyl chloride), and PVDC (polyvinylidene chloride).

9. The loudspeaker system according to claim 7, wherein the filmy member includes at least one rubber material selected from the group consisting of SBR (styrene-butadiene rubber), SBS (styrene-butadiene-styrene rubber), silicone rubber, IIR (butyl rubber), EPM (ethylene-propylene rubber), and urethane rubber.

10. The loudspeaker system according to claim 1, wherein the filler gas has molecules which are capable of being physically absorbed into fine pores formed in the absorbent.

11. The loudspeaker system according to claim 1, wherein the package body is disposed so as to hang in the vacant space from an upper side of the cabinet.

12. The loudspeaker system according to claim 11, wherein a lower end of the package body is fixed to a bottom side of the cabinet.

13. The loudspeaker system according to claim 1, wherein the package body is disposed in the vacant space so that at least two opposite ends thereof are respectively fixed to lateral sides of the cabinet.

14. The loudspeaker system according to claim 1, further comprising a board-shaped member which is disposed in the vacant space and fixed to a part of the cabinet, the board-shaped member having a plurality of sound holes formed therein,
  wherein the package body is disposed in the vacant space so that at least two facing ends are respectively fixed to the board-shaped member and a backside of the cabinet.

15. The loudspeaker system according to claim 1, wherein the package body has a plurality of bag sections which are segmented in a grid manner and connected to each other, and
  wherein each of the bag sections has the absorbent and the filler sealed therein.

16. The loudspeaker system according to claim 15, wherein the plurality of bag sections are formed by laminating at least two sheet-like members.

17. The loudspeaker system according to claim 15, further comprising a board-shaped member which is disposed in the vacant space and fixed to a part of the cabinet, the board-shaped member having a plurality of sound holes formed therein,
  wherein the package body is disposed in the vacant space so that four sides thereof are respectively fixed to the board-shaped member, the backside of the cabinet, and both lateral sides of the cabinet.

18. The loudspeaker system according to claim 1, further comprising a predetermined amount of a drying agent which is sealed into the package body.

19. The loudspeaker system according to claim 1, further comprising an acoustic port which is provided at an opening formed in the cabinet, inverts a phase by resonating with sound of a specific frequency, which is emitted from the speaker unit into the vacant space, and emits the sound externally.

* * * * *